United States Patent
Suzuki et al.

(10) Patent No.: US 10,838,887 B2
(45) Date of Patent: Nov. 17, 2020

(54) MEMORY CONTROLLER, STORAGE DEVICE, INFORMATION PROCESSING SYSTEM, AND MEMORY CONTROL METHOD

(71) Applicant: Sony Corporation, Tokyo (JP)

(72) Inventors: Kai Suzuki, Kanagawa (JP); Hiroaki Yamazoe, Tokyo (JP)

(73) Assignee: Sony Corporation, Tokyo (JP)

(*) Notice: Subject to any disclaimer, the term of this patent is extended or adjusted under 35 U.S.C. 154(b) by 355 days.

(21) Appl. No.: 15/750,287

(22) PCT Filed: Jul. 1, 2016

(86) PCT No.: PCT/JP2016/069605
§ 371 (c)(1),
(2) Date: Feb. 5, 2018

(87) PCT Pub. No.: WO2017/043161
PCT Pub. Date: Mar. 16, 2017

(65) Prior Publication Data
US 2018/0225236 A1 Aug. 9, 2018

(30) Foreign Application Priority Data
Sep. 9, 2015 (JP) ................ 2015-177156

(51) Int. Cl.
*G06F 13/16* (2006.01)
*G06F 1/08* (2006.01)
(Continued)

(52) U.S. Cl.
CPC ............ *G06F 13/1689* (2013.01); *G06F 1/08* (2013.01); *G06F 3/061* (2013.01); *G06F 3/0629* (2013.01);
(Continued)

(58) Field of Classification Search
None
See application file for complete search history.

(56) References Cited

U.S. PATENT DOCUMENTS 7,290,109 B2 * 10/2007 Horii ................ G06F 13/1647
711/103
2003/0065899 A1 * 4/2003 Gorobets ............. G06F 3/0613
711/165
(Continued)

FOREIGN PATENT DOCUMENTS

JP 07-152635 A 6/1995
JP 2006-099569 A 4/2006
(Continued)

OTHER PUBLICATIONS

Japanese Office Action dated Sep. 3, 2019 for corresponding Japanese Application No. 2015-177156.

*Primary Examiner* — Tanh Q Nguyen
(74) *Attorney, Agent, or Firm* — Michael Best & Friedrich LLP

(57) ABSTRACT

High-speed data transfer is performed in a storage device having a plurality of semiconductor memories while an increase in power consumption is prevented.

In a memory controller, a request transfer unit transfers a request for demanding transfer of data and data based on the request to each of a plurality of memories in synchronization with a clock signal. A busy time measurement unit measures a busy time which is a time required for access based on the request, for a selected memory which is one memory out of the plurality of memories. A clock signal adjustment unit substantially equalizes the measured busy time of the selected memory and a total time required for transferring (Continued)

the requests and the data for the plurality of memories except the selected memory by adjusting a frequency of the clock signal.

10 Claims, 17 Drawing Sheets

(51) Int. Cl.
*G06F 3/06* (2006.01)
*G06F 12/00* (2006.01)

(52) U.S. Cl.
CPC ............ *G06F 3/0683* (2013.01); *G06F 12/00* (2013.01); *G06F 13/16* (2013.01); *G06F 3/06* (2013.01); *Y02D 10/14* (2018.01)

(56) References Cited

U.S. PATENT DOCUMENTS

| | | | | |
|---|---|---|---|---|
| 2003/0123287 | A1* | 7/2003 | Gorobets | G06F 3/0659 365/185.11 |
| 2005/0278491 | A1* | 12/2005 | Aakjer | G06F 13/4239 711/157 |
| 2008/0162853 | A1* | 7/2008 | Bang | G06F 13/1689 711/167 |
| 2009/0265513 | A1* | 10/2009 | Ryu | G11C 29/52 711/149 |
| 2018/0225236 | A1* | 8/2018 | Suzuki | G06F 3/0629 |

FOREIGN PATENT DOCUMENTS

| | | |
|---|---|---|
| JP | 2008065859 A | 3/2008 |
| JP | 2009-146541 A | 7/2009 |
| JP | 2011191367 A | 9/2011 |
| WO | 2009/125572 A1 | 10/2009 |

* cited by examiner a b a b a b

| | | | 210 |
|---|---|---|---|
| WRITING | LOWER PAGE | 1000 | |
| | UPPER PAGE | 1500 | |
| READING | LOWER PAGE | 90 | |
| | UPPER PAGE | 100 | |

# MEMORY CONTROLLER, STORAGE DEVICE, INFORMATION PROCESSING SYSTEM, AND MEMORY CONTROL METHOD

TECHNICAL FIELD

The present technology relates to a memory controller, a storage device, an information processing system, and a memory control method. More particularly, the present technology relates to a memory controller, a storage device, an information processing system, and a memory control method that access a plurality of memories.

BACKGROUND ART

Conventionally, a storage device using a semiconductor memory has been used as a storage device that stores large volumes of data such as images at high speed. In such a storage device, a system that reduces power consumption while maintaining a high data transfer rate has been proposed (refer to, for example, Patent Document 1).

CITATION LIST

Patent Document

Patent Document 1: Japanese Patent Application Laid-Open No. 2009-146541

SUMMARY OF THE INVENTION

Problems to be Solved by the Invention

According to the conventional technology described above, in a storage device having a single dynamic random access memory (DRAM), a memory controller changes a power supply voltage and the frequency of a clock signal supplied to the DRAM. This change of the power supply voltage and the like to be supplied to the DRAM is performed on the basis of the access frequency of the DRAM or the like. With this configuration, the above-described conventional technology enables reduction of power consumption while maintaining a desired data transfer rate. Meanwhile, NAND type flash memories are often employed in storage devices such as storages that store large volumes of data. Unlike the DRAM, this NAND type flash memory has the property that the time required for accessing data does not become a constant value. Therefore, even if the conventional technology of changing the frequency of the clock signal on the basis of the access frequency is applied to the system having the NAND type flash memory, there is a disadvantage that the frequency of the clock signal that optimizes the balance between the data transfer rate and the power consumption cannot be obtained.

The present technology has been developed in view of such a situation and it is an object of the present technology to perform high-speed data transfer in a storage device provided with a plurality of semiconductor memories while preventing an increase in power consumption.

Solutions to Problems

The present technology has been made in order to solve the above-mentioned disadvantages and a first aspect thereof is a memory controller and a memory control method including: a request transfer unit that transfers a request for demanding transfer of data and data based on the request to each of a plurality of memories in synchronization with a clock signal; a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal. With this configuration, an action is achieved in which the frequency of the clock signal is adjusted such that the busy time of the selected memory and the total time required for transferring the requests and the data for the plurality of memories except the selected memory are substantially equalized.

In addition, in this first aspect, the busy time measurement unit may measure the busy time on the basis of a busy signal output from each of the plurality of memories to indicate that the access is being performed. With this configuration, an action is achieved in which the busy time is measured on the basis of the busy signal.

In addition, in this first aspect, a busy time holding unit that holds the measured busy time may be further provided, and the clock signal adjustment unit may substantially equalize the held busy time and a total time required for transferring the requests and the data for the plurality of memories except the selected memory by adjusting the frequency of the clock signal. With this configuration, an action is achieved in which the clock signal is adjusted on the basis of the busy time measured by the busy time measurement unit and held in the busy time holding unit.

In addition, in this first aspect, the busy time measurement unit may measure the busy time for each of the plurality of memories and supply a shortest busy time among the separately measured busy times to the clock signal adjustment unit. With this configuration, an action is achieved in which the frequency of the clock signal is adjusted on the basis of the shortest busy time among the plurality of memories.

In addition, in this first aspect, the request transfer unit may transfer a write request for demanding writing of the data and write data based on the write request in synchronization with a clock signal; the busy time measurement unit may measure the busy time of the selected memory based on the write request; and the clock signal adjustment unit may substantially equalize the measured busy time of the selected memory and a total time required for transferring the write requests and the write data for the plurality of memories except the selected memory by adjusting the frequency of the clock signal. With this configuration, an action is achieved in which the frequency of the clock signal is adjusted for the write request such that the busy time of the selected memory and the total time required for transferring the write requests and the data for the plurality of memories except the selected memory are substantially equalized.

In addition, in this first aspect, the request transfer unit may transfer a read request for demanding reading of the data and read data based on the read request in synchronization with a clock signal; the busy time measurement unit may measure the busy time of the selected memory based on the read request; and the clock signal adjustment unit may substantially equalize the measured busy time of the selected memory and a total time required for transferring the read requests and the read data for the plurality of memories except the selected memory by adjusting the frequency of the clock signal. With this configuration, an action is achieved in which the frequency of the clock signal is adjusted for the read request such that the busy time of the selected memory and the total time required for transferring the read requests and the data for the plurality of memories except the selected memory are substantially equalized.

In addition, in this first aspect, the busy time measurement unit may measure the busy time for each of address spaces of the plurality of memories in which times required for the access differ for each address space, and the clock signal adjustment unit may adjust the frequency of the clock signal for each address space. With this configuration, the frequency of the clock signal is adjusted in the memory in which the times required for the access differ for each address space. Then, an action is achieved in which the busy time of the selected memory and the total time required for transferring the requests and the data for the plurality of memories except the selected memory are substantially equalized.

In addition, a second aspect of the present technology is a storage device including: a plurality of memories; a request transfer unit that transfers a request for demanding transfer of data and data based on the request to each of the plurality of memories in synchronization with a clock signal; a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal. With this configuration, an action is achieved in which the frequency of the clock signal is adjusted such that the busy time of the selected memory and the total time required for transferring the requests and the data for the plurality of memories except the selected memory are substantially equalized.

In addition, a third aspect of the present technology is an information processing system including: a storage device provided with: a plurality of memories; a request transfer unit that transfers a request for demanding transfer of data and data based on the request to each of the plurality of memories in synchronization with a clock signal; a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal; and a host computer that accesses the storage device. With this configuration, an action is achieved in which the frequency of the clock signal is adjusted such that the busy time of the selected memory and the total time required for transferring the requests and the data for the plurality of memories except the selected memory are substantially equalized.

Effects of the Invention

According to the present technology, an excellent effect of performing high-speed data transfer in a storage device provided with a plurality of semiconductor memories while preventing an increase in power consumption can be exerted. Note that the effects described herein are not necessarily limited and any effects described in the present disclosure may be applied.

MODE FOR CARRYING OUT THE INVENTION

Modes for carrying out the present technology (hereinafter, referred to as embodiments) will be described below. The description will be given in the following order.

1. First Embodiment (Example in Case of Adjusting Frequency of Clock Signal on the basis of Measured Busy Time)
2. Second Embodiment (Example in Case of Measuring Shortest Busy Time among Busy Times of Plurality of Memories)
3. Third Embodiment (Example in Case of Applying to Memory whose Busy Time Varies according to Address)

1. First Embodiment

[Configuration of Information Processing System]

Figure 1:
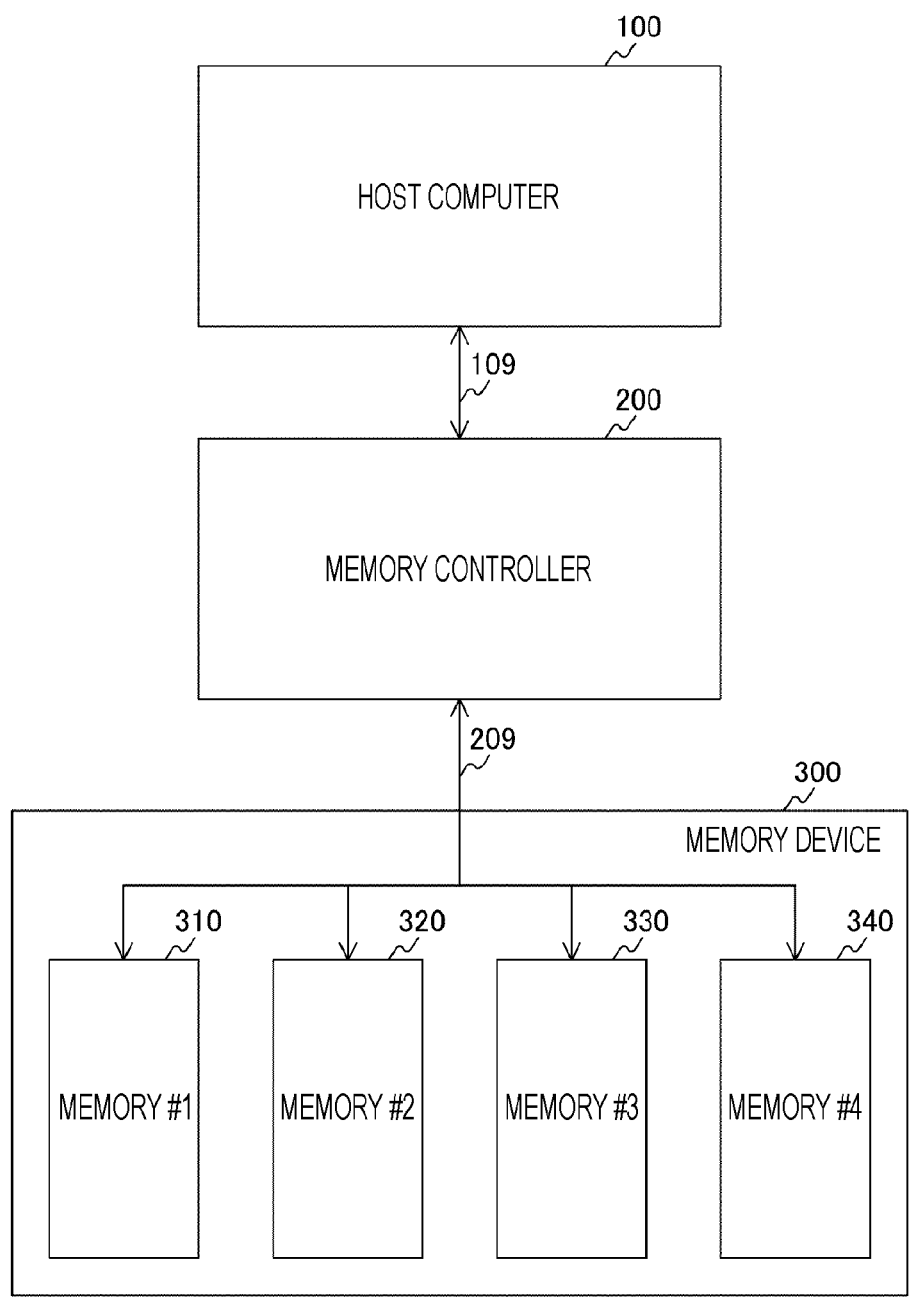
FIG. 1 is a diagram illustrating a configuration example of an information processing system according to embodiments of the present technology.

FIG. 1 is a diagram illustrating a configuration example of an information processing system according to embodiments of the present technology. The information processing system in FIG. 1 is provided with a host computer 100, a memory controller 200, and a memory device 300. Note that the memory controller 200 and the memory device 300 constitute a storage device.

The host computer 100 performs various processes in the information processing system. This host computer 100 issues a command for writing, reading, or the like to the memory device 300 via the memory controller 200 to access. A signal line 109 is a signal line electrically connecting the host computer 100 and the memory controller 200.

The memory controller 200 controls the memory device 300. This memory controller 200 interprets write and read commands issued from the host computer 100 and demands write and read requests based on these commands from the memory device 300. A signal line 209 is a signal line electrically connecting the memory controller 200 and the memory device 300 and has a plurality of signal lines that transmit control signals, data, and the like.

The memory device 300 stores data. Access to this data is performed on the basis of the request demanded from the memory controller 200. At this time, data is transferred between the memory device 300 and the memory controller 200.

The memory device 300 is provided with a memory #1 (310), a memory #2 (320), a memory #3 (330), and a memory #4 (340). These memories are commonly connected to the signal line 209 excluding a signal line transmitting a chip enable signal for selecting a memory, and the like.

The memories #1 (310) to #4 (340) are semiconductor memory chips. A memory chip constituted by a NAND type flash memory is assumed as each of these memories #1 (310) to #4 (340). This NAND type flash memory is a nonvolatile memory that uses a MOS transistor having a floating gate as a memory cell. Data is written by injecting an electric charge into this floating gate. In addition, when data is rewritten, it is necessary to write new data after erasing by extracting an electric charge from the floating gate. Data is written in units of pages and erased in units of blocks each made up of a plurality of pages. Examples of the size of the page include 2176 bytes and examples of the size of the block include 64 pages.

On the other hand, when data is read, since the movement of the electric charge to or from the floating gate is not involved, the time required for reading data is shorter than the time required for writing data. As an example, the time required for writing and reading data is 500 μs and 50 μs, respectively. During a period of access for which data is being written and read as described above, the NAND type flash memory is in a busy state in which another process cannot be accepted. Each of the memories #1 (310) to #4 (340) outputs a busy signal indicating that it is in this busy state to the memory controller 200. Details of writing and reading data in the memories #1 (310) to #4 (340) will be described later.

When writing, the host computer 100 issues a write command and write data accompanying this command to the memory controller 200. The memory controller 200 interprets the issued write command and generates a write request on the basis of a write destination address and the number of pieces of the write data included in the command. Next, the memory controller 200 transfers the generated write request and the write data to the memory device 300. The memory device 300 performs writing on the basis of this request.

On the other hand, at the time of reading, the host computer 100 issues a read command to the memory controller 200. The memory controller 200 interprets this command and generates a read request on the basis of a read destination address and the number of pieces of read data included in the command. Next, the memory controller 200 transfers the generated read request to the memory device 300. The memory device 300 performs reading on the basis of this request and transfers data that has been read to the memory controller 200. The memory controller 200 outputs this transferred data to the host computer 100 as the read data.

[Configuration of Memory Controller]

Figure 2:
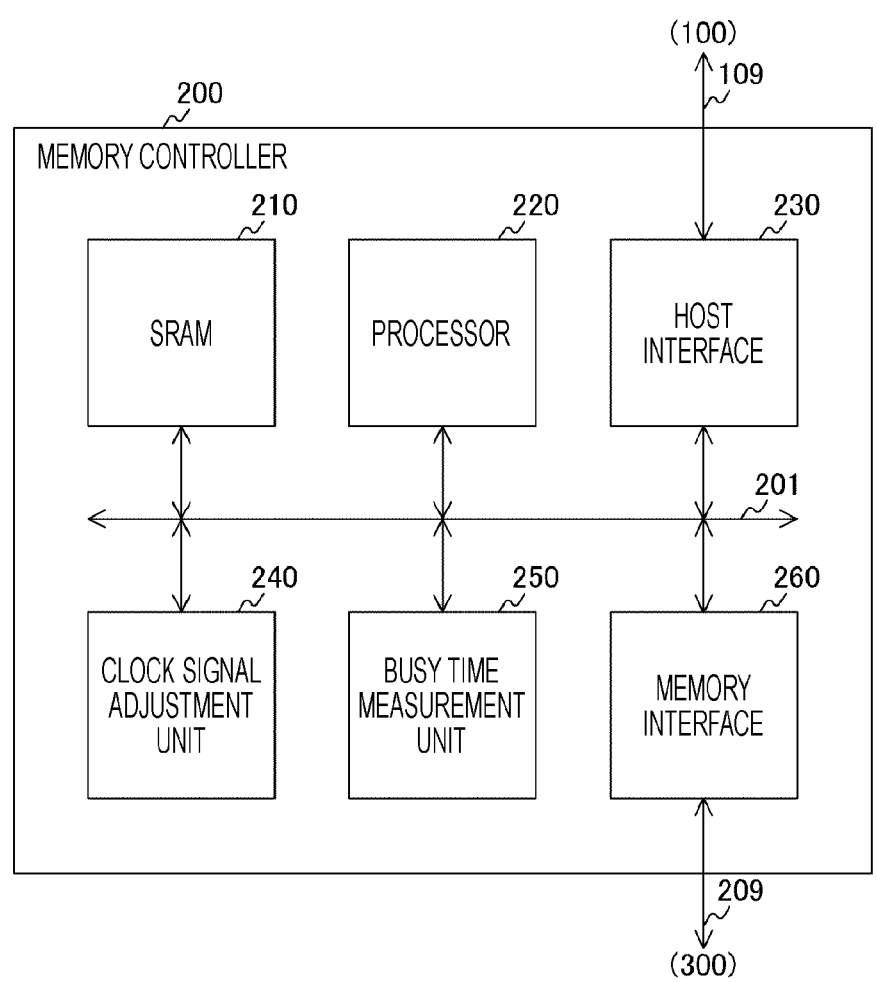
FIG. 2 is a diagram illustrating a configuration example of a memory controller 200 according to a first embodiment of the present technology.

FIG. 2 is a diagram illustrating a configuration example of the memory controller 200 according to the first embodiment of the present technology. This memory controller 200 is provided with a processor 220, a static random access memory (SRAM) 210, a host interface 230, a clock signal adjustment unit 240, and a busy time measurement unit 250. In addition, the memory controller 200 is further provided with a memory interface 260.

The host interface 230 is an interface that communicates with the host computer 100. The command issued by the host computer 100 is input to the memory controller 200 via this host interface 230.

The processor 220 controls the entire memory controller 200. This processor 220 also interprets the command issued by the host computer 100 and generates a request based on this command. That is, the processor 220 generates a write request in a case where the issued command is the write command and generates a read request in a case where the issued command is the read command. When the request is generated, the processor 220 performs an address conversion process. Here, the address conversion process is a process of converting a logical address that is an address included in the command into a physical address that is an address in the memory device 300. Since the memory device 300 is provided with the memories #1 (310) to #4 (340), the processor 220 allocates the physical addresses to these memories at the time of address conversion. In addition, since the memory #1 (310) and the like are accessed by a page address, the processor 220 converts the logical address into the physical address constituted by the page address. Note that it is assumed that the write and read requests are performed in units of pages.

The SRAM 210 is a memory that holds firmware of the processor 220. In addition, this SRAM 210 further holds a busy time to be described later and temporarily holds the write data and the like. Note that the SRAM 210 is an example of a busy time holding unit described in the claims.

The busy time measurement unit 250 measures the busy time which is a busy state time of the memories #1 (310) to #4 (340). This busy time measurement unit 250 measures the busy time on the basis of an instruction by the processor 220 to start measurement and the busy signal described with reference to FIG. 3. As described earlier, since the busy times of the NAND type flash memory significantly differ between writing and reading, the busy time measurement unit 250 measures the busy time for both writing and reading. Details of the configuration of the busy time measurement unit 250 will be described later.

The clock signal adjustment unit 240 adjusts the frequency of a clock signal. This clock signal is a signal serving as a reference of the operation of each member of the memory controller 200. In addition, transfer of a request and data between the memory controller 200 and the memory device 300 is performed in synchronization with this clock signal. Here, one memory out of the memories #1 (310) to #4 (340) is selected such that the busy time measurement unit 250 measures the busy time for this memory. This selected memory is referred to as selected memory. By adjusting the frequency of the clock signal, the clock signal adjustment unit 240 substantially equalizes a total time required for transferring requests and data to the memories #1 (310) to #4 (340) except this selected memory and the busy time.

When writing to the memory device 300 is performed, the clock signal adjustment unit 240 substantially equalizes a total time required for transferring the write requests and the write data for the memories except the selected memory and the busy time of the selected memory at the time of writing. When reading from the memory device 300 is performed, the clock signal adjustment unit 240 substantially equalizes a total time required for transferring the read requests and the read data for the memories except the selected memory and the busy time of the selected memory at the time of reading. Details of the configuration of the clock signal adjustment unit 240 will be described later.

The memory interface 260 is an interface that communicates with the memory device 300. This memory interface 260 transfers a request generated by the processor 220 and data based on this request to the memory device 300. As described above, these transfers are performed in synchronization with the clock signal adjusted by the clock signal adjustment unit 240. When writing to the memory device 300 is performed, the memory interface 260 transfers the write request generated by the processor 220 and the write data to the memory device 300. When reading from the memory device 300 is performed, the memory interface 260 transfers the read request generated by the processor 220 to the memory device 300. Thereafter, the memory interface 260 transfers the read data from the memory device 300. Note that the memory interface 260 is an example of a request transfer unit described in the claims.

In a case where data accompanying the command from the host computer 100 spans a plurality of pages, the memory controller 200 generates a plurality of requests to sequentially output to the memory device 300. In such a case, address conversion by the processor 220 is performed such that targets of this plurality of requests are distributed to the memories #1 (310) to #4 (340). With this configuration, requests targeting each memory of the memory device 300 are generated on order and sequentially transferred to the memory device 300 by the memory interface 260. At this time, during a period for which a memory to which the request was first transferred, for example, the memory #1 (310) is in the busy state, requests and data are transferred to the other memories, for example, the memory #2 (320) to the memory #4 (340). With this configuration, it is possible to transfer requests and data on the signal line 209 without breaks. The transfer of requests and data will be described later.

[Functional Configuration of Memory Controller]

Figure 3:
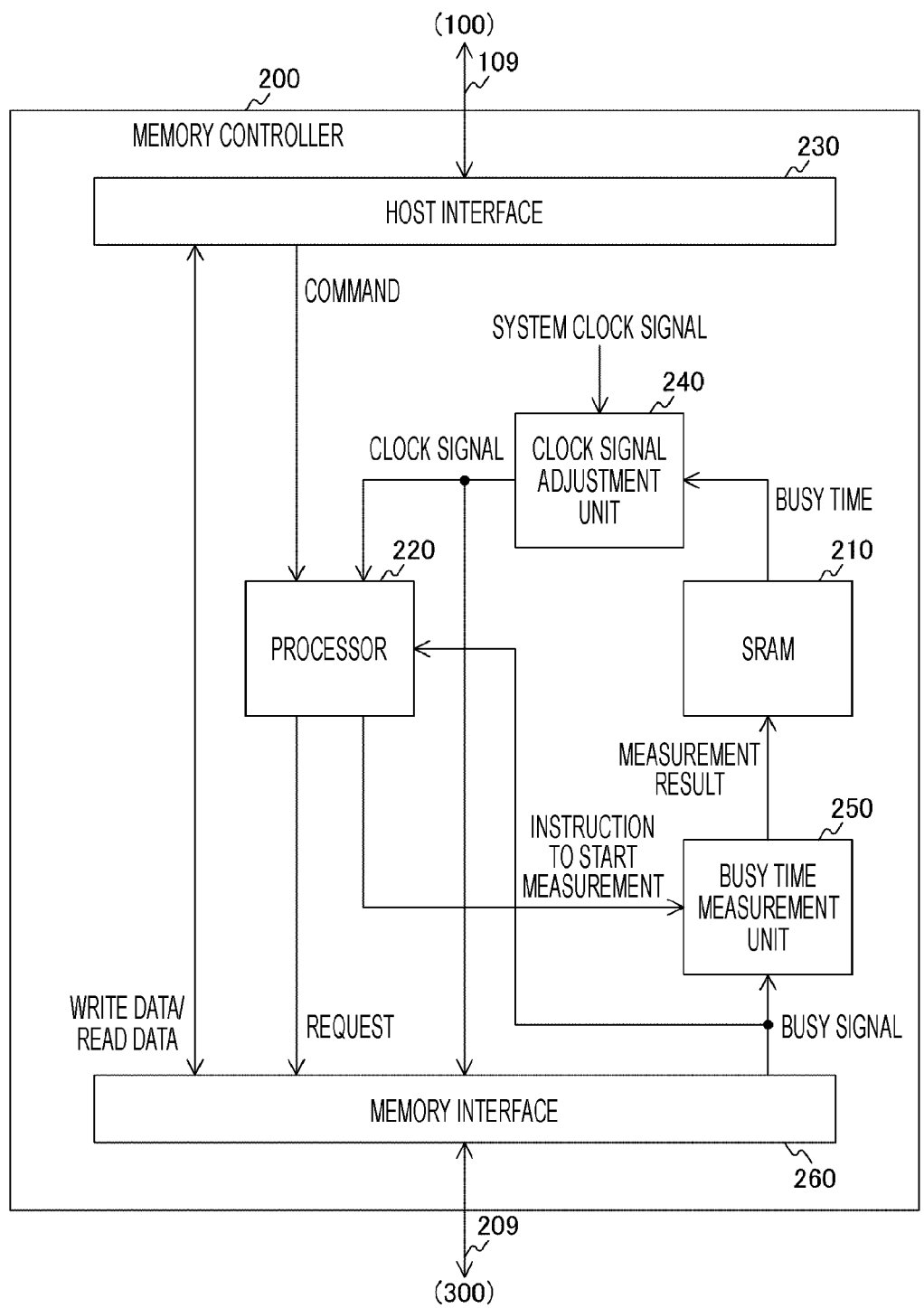
FIG. 3 is a diagram illustrating a functional configuration example of the memory controller 200 according to the first embodiment of the present technology.

FIG. 3 is a diagram illustrating a functional configuration example of the memory controller 200 according to the first embodiment of the present technology. FIG. 3 represents the flow of signals and the like in each member of the memory controller 200. When a command from the host computer 100 is input to the processor 220 via the host interface 230, the processor 220 generates a request to output to the memory interface 260. After outputting the request, the processor 220 outputs an instruction to start measurement to the busy time measurement unit 250. The output request is further transferred to the memory device 300 by the memory interface 260 in synchronization with the clock signal. Thereafter, the busy signal is output from the memory #1 (310) or the like to which the request was transferred. This busy signal is input to the busy time measurement unit 250 via the memory interface 260. The busy time measurement unit 250 measures the busy time on the basis of the instruction from the processor 220 to start measurement and the busy signal and causes the SRAM 210 to hold the busy time as a measurement result.

Since the memory controller 200 according to the first embodiment of the present technology is configured to cause the SRAM 210 to hold the busy time, the busy time can be measured by the busy time measurement unit 250 when the first request after activation of the storage device is transferred. Then, the busy time held in the SRAM 210 is used in the transfer of the subsequent requests, whereby a process required for measuring the busy time can be omitted.

The clock signal adjustment unit 240 reads the busy time from the SRAM 210 and adjusts the clock signal on the basis of the read busy time. At this time, the clock signal adjustment unit 240 adjusts the clock signal by adjusting the frequency of a system clock signal. Here, the system clock signal is a clock signal supplied from the host computer 100 or the like. Note that, in transferring the first request after activation of the storage device described above, the clock signal adjustment unit 240 outputs a clock signal of a frequency predefined in the system to the memory interface 260 and the like. The write data and the read data are bidirectionally transferred between the host interface 230 and the memory interface 260. In addition, this data transfer in the host interface 230 and the memory interface 260 is performed by the processor 220. The processor 220 can temporarily hold the data in the SRAM 210 during this transfer.

[Configuration of Busy Time Measurement Unit]

Figure 4:
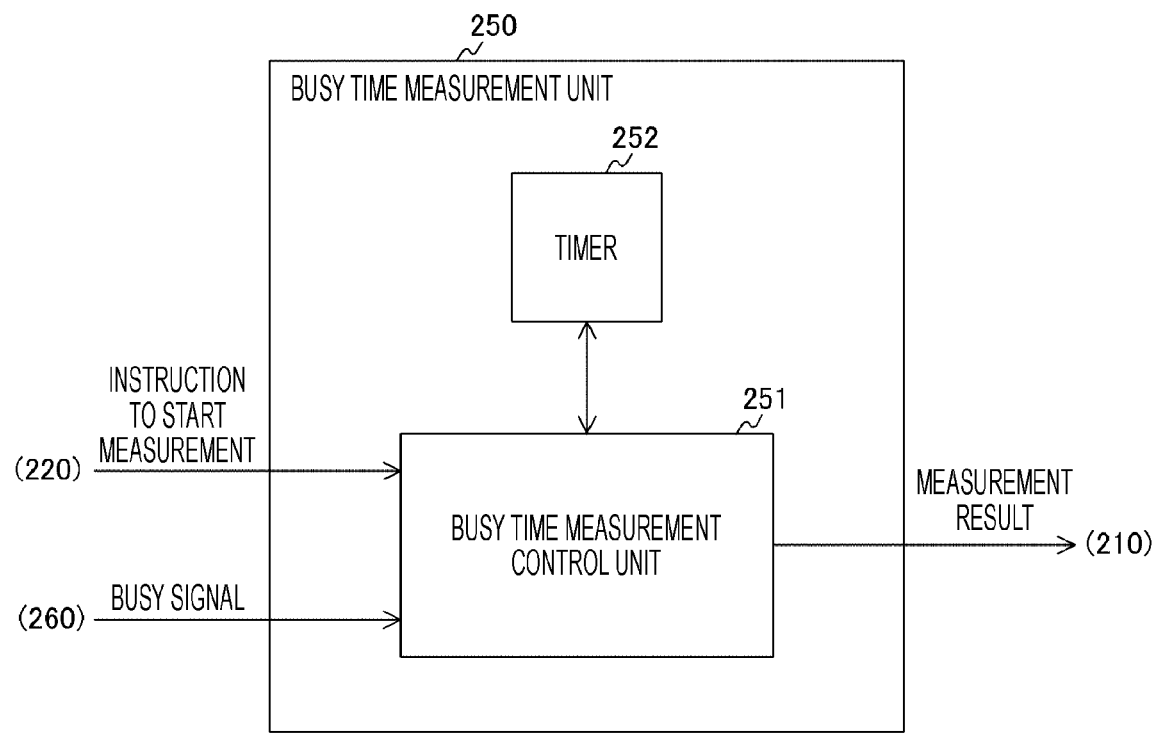
FIG. 4 is a diagram illustrating a configuration example of a busy time measurement unit 250 according to the first embodiment of the present technology.

FIG. 4 is a diagram illustrating a configuration example of the busy time measurement unit 250 according to the first embodiment of the present technology. This busy time measurement unit 250 is provided with a busy time measurement control unit 251 and a timer 252.

The timer 252 is a timer that counts the busy time. This timer 252 counts the busy time and holds a time count value under the control of the busy time measurement control unit 251. In addition, the timer 252 is reset by the control of the busy time measurement control unit 251.

The busy time measurement control unit 251 controls the timer 252 to measure the busy time. The busy time is measured as follows. Once the instruction to start measurement is input from the processor 220, the busy time measurement control unit 251 resets the timer 252. Thereafter, when the input of the busy signal is started in accordance with a transition of the memory #1 (310) or the like to the busy state, the busy time measurement control unit 251 causes the timer 252 to start counting time. When the input of the busy signal from the memory #1 (310) is stopped due to return from the busy state, the busy time measurement control unit 251 stops the timer 252 from counting time. Next, the busy time measurement control unit 251 reads the time count value held in the timer 252 and causes the SRAM 210 to hold the read time count value as a busy time. In this manner, the busy time measurement control unit 251 measures the busy time of the memory #1 (310) or the like on the basis of the instruction from the processor 220 to start measurement and the busy signal.

[Busy Time]

Figure 5:
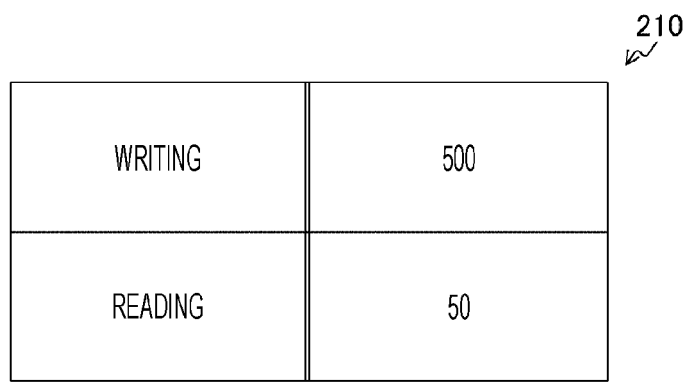
FIG. 5 is a diagram illustrating examples of a busy time according to the first embodiment of the present technology.

FIG. 5 is a diagram illustrating examples of the busy time according to the first embodiment of the present technology. FIG. 5 represents the busy time held in the SRAM 210. As represented in FIG. 5, the busy times for writing and reading are separately held. Here, the unit of the busy time is μs.

[Configuration of Clock Signal Adjustment Unit]

Figure 6:
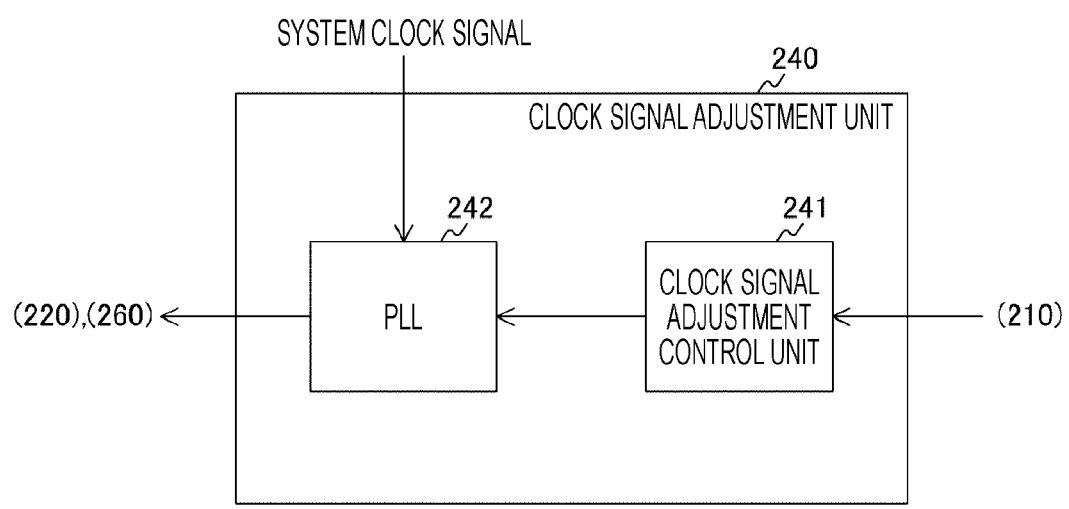
FIG. 6 is a diagram illustrating a configuration example of a clock signal adjustment unit 240 according to the first embodiment of the present technology.

FIG. 6 is a diagram illustrating a configuration example of the clock signal adjustment unit 240 according to the first embodiment of the present technology. This clock signal adjustment unit 240 is provided with a clock signal adjustment control unit 241 and a PLL 242.

The PLL 242 is constituted by a phase locked loop (PLL) circuit and adjusts the frequency of the clock signal. This PLL 242 outputs a clock signal whose frequency has been adjusted by multiplying and dividing the input system clock signal.

The clock signal adjustment control unit 241 controls the PLL 242 on the basis of the busy time read from the SRAM 210. Specifically, the PLL 242 is controlled on the basis of the following procedures. First, the clock signal adjustment control unit 241 calculates the cycle of the clock signal by the following expression.

Cycle=busy time/(required number of clocks×(number of memories−1))

Note that the required number of clocks is the number of clocks required for writing or reading. The number of memories is the number of memories #1 (310) to #4 (340) included in the memory device 300 described with reference to FIG. 1. Next, the clock signal adjustment control unit 241 further calculates multiplication and division ratios of the PLL 242 using the calculated cycle and the cycle of the system clock signal and outputs these ratios to the PLL 242. The PLL 242 performs above-mentioned multiplication and division on the basis of these ratios.

[Writing Operation]

Figure 7:
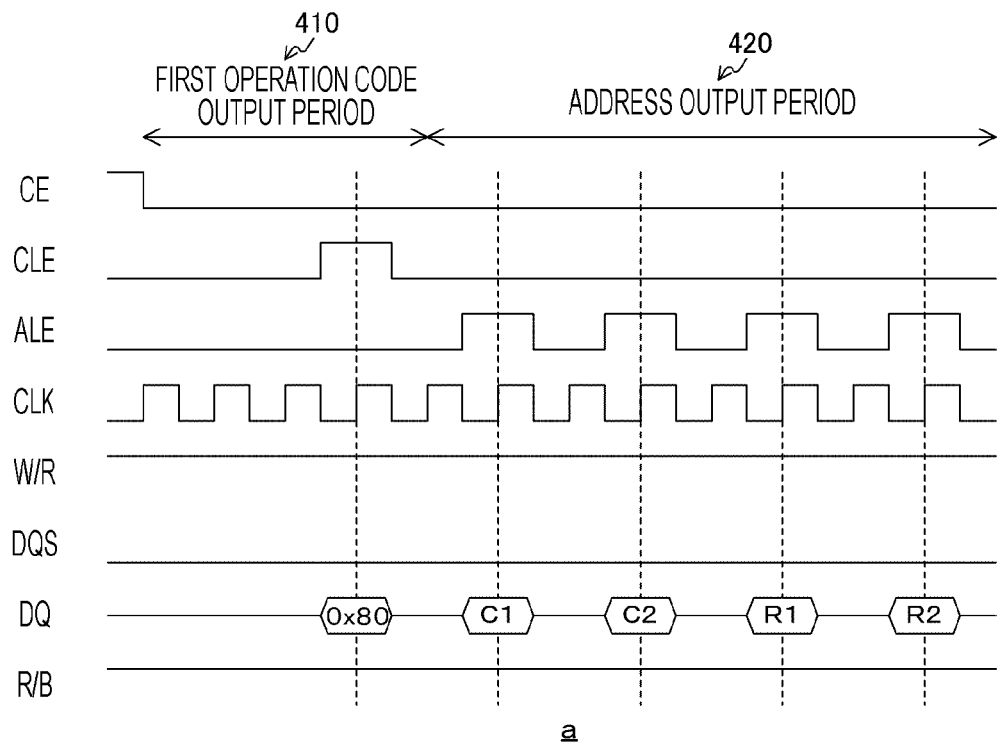
FIG. 7 is a diagram illustrating an example of a writing operation according to the first embodiment of the present technology.
Figure 7:
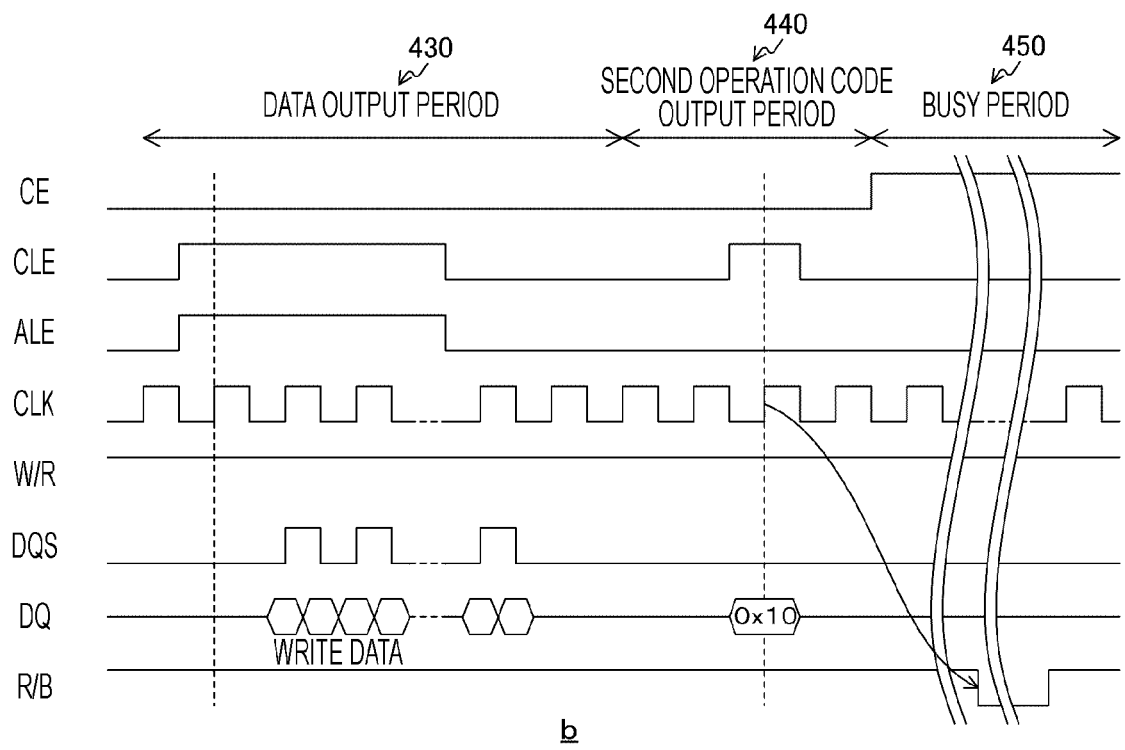

FIG. 7 is a diagram illustrating an example of a writing operation according to the first embodiment of the present technology. FIG. 7 represents the state of electric signals on the signal line 209 at the time of the write request. Chip enable (CE) in FIG. 7 is equivalent to the chip enable signal described with reference to FIG. 1 and is a signal for selecting the memories #1 (310) to #4 (340). By setting the value to "0", an applicable one of the memories #1 (310) to #4 (340) is selected. Command latch enable (CLE) is a signal for instructing the input of an operation code and the input/output of data. Address latch enable (ALE) is a signal for instructing the input of an address and the input/output of data. Clock (CLK) is a clock signal for picking the timing of transfer of data and the like. In synchronization with the rising of CLK, the operation code and the like are fetched into the memory #1 (310) or the like. The clock signal output from the clock signal adjustment unit 240 is used for this CLK.

Write/read direction (W/R) is a signal indicating the direction of signal input in DQS and I/O to be described later. When the value is "1", this represents signal input from the memory controller 200 to the memory #1 (310) or the like. On the other hand, when the value is "0", this represents signal input from the memory #1 (310) or the like to the memory controller 200 and the memory #1 (310) or the like is allowed to output data to the memory controller 200. Data strobe (DQS) is a signal indicating that an I/O signal is valid. Input/output port (I/O) is an 8-bit signal that transmits the operation code, the address, and data. Ready/busy (R/B) is the busy signal of the memories #1 (310) to #4 (340). When the memories #1 (310) to #4 (340) are in the busy state, the value is "0". Among these signals, CE is individually transmitted to the memories #1 (310) to #4 (340), while the other signals are wired in common to the memories #1 (310) to #4 (340). In addition, as for R/B, the respective busy signals of the memories #1 (310) to #4 (340) are wired-OR connected to be input to the memory controller 200.

In a first operation code output period 410, the memory controller 200 first sets CE to the value "0". After a lapse of a predetermined time, the memory controller 200 sets CLE to the value "1" and sets I/O to the value "0×80". These values are fetched into the memory #1 (310) or the like at the timing of the rising of CLK. Note that the value "0×80" and the value "0×10" output in a second operation code output period 440 to be described later are operation codes representing data writing.

In an address output period 420, the memory controller 200 sets ALE to the value "1" and sets I/O to the value "C1" after a lapse of a predetermined time. These values are fetched into the memory #1 (310) or the like at the timing of the rising of CLK. After a lapse of a predetermined time, the value "C2" is likewise fetched into the memory #1 (310) or the like. Here, the values "C1" and "C2" are 8-bit values representing column addresses of the NAND type flash memory. The memory controller 200 outputs the values "R1" and "R2" to the memory #1 (310) or the like using a similar procedure. These values are 8-bit values indicating row addresses of the NAND type flash memory. For convenience, it is assumed that the memory #1 (310) and the like are accessed by 16-bit column address and row address.

In a data output period 430, the memory controller 200 sets CLE and ALE to the value "1" after a lapse of a predetermined time. These values are fetched into the memory #1 (310) or the like at the timing of the rising of CLK. Thereafter, the memory controller 200 sequentially outputs the write data as I/O. Furthermore, the memory controller 200 outputs a signal having the same frequency as CLK as DQS. The memory #1 (310) or the like fetches the I/O signals as data signals in synchronization with both rising and falling edges of DQS. By repeating this operation, the write data of one page is transferred. The memory controller 200 sets CLE and ALE to the value "0" immediately before the data transfer is completed.

In the second operation code output period 440, the memory controller 200 sets CLE to the value "1" and sets I/O to the value "0×10" after a lapse of a predetermined time. These values are fetched into the memory #1 (310) or the like at the timing of the rising of CLK. Thereafter, the memory controller 200 sets CE to the value "1". This completes the transfer of the write request and the data.

In a busy period 450, the memory #1 (310) or the like sets R/B to the value "0" after a lapse of a predetermined time from fetching the operation code in the second operation code output period 440. After the writing is completed, the memory #1 (310) or the like sets R/B to the value "1" to notify the memory controller 200 of the completion of writing.

[Reading Operation]

Figure 8:
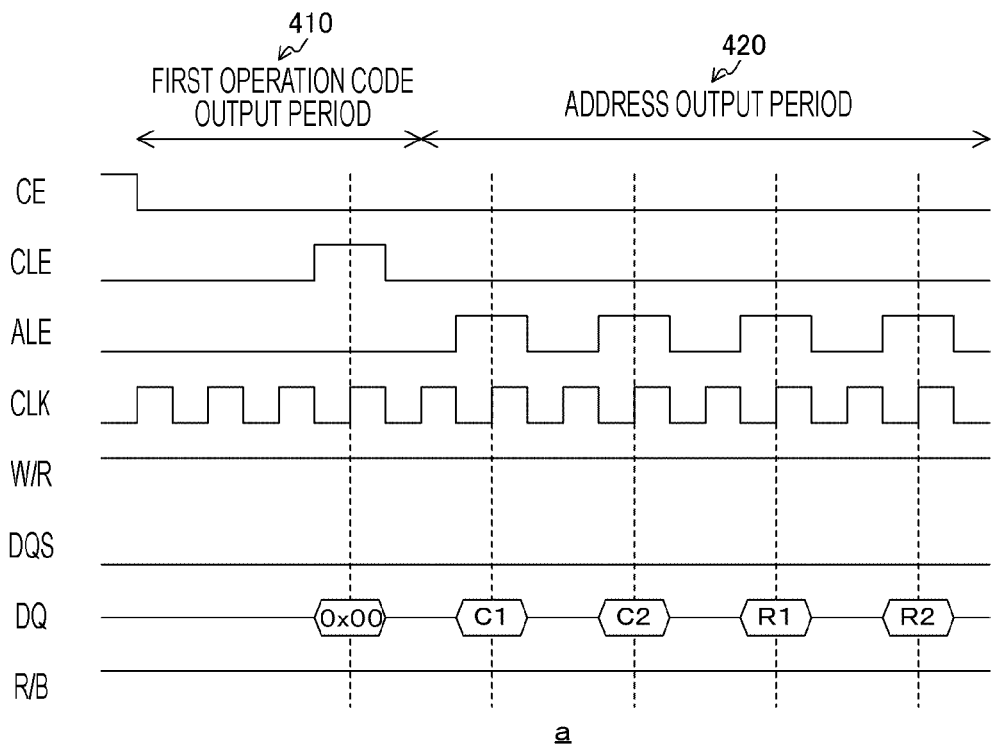
FIG. 8 is a diagram illustrating an example of a reading operation according to the first embodiment of the present technology.
Figure 8:
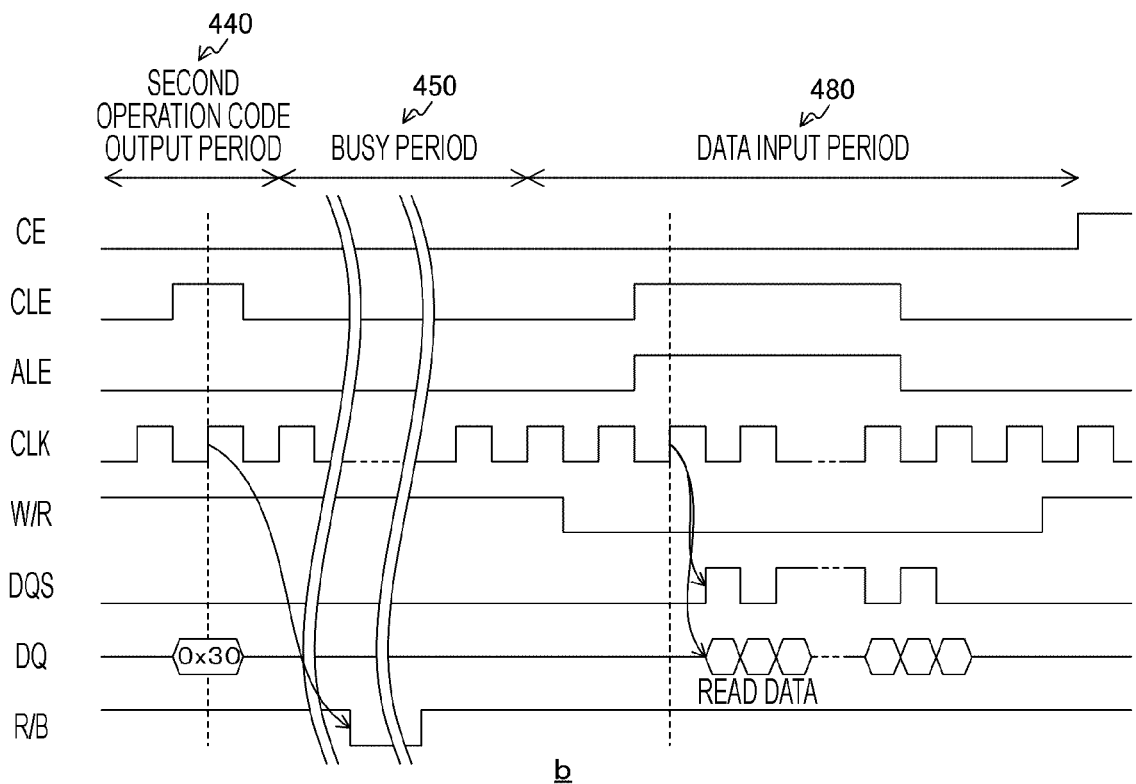

FIG. 8 is a diagram illustrating an example of a reading operation according to the first embodiment of the present technology. FIG. 8 represents the state of electric signals on the signal line 209 at the time of the read request. Note that, since the address output period 420 has a similar operation to that of the address output period 420 described with reference to FIG. 7, the description thereof will be omitted.

In the first operation code output period 410, the memory controller 200 outputs the value "0×00" as an operation code. This value "0×00" and the value "0×30" output in the second operation code output period 440 are operation codes representing data reading.

In the second operation code output period 440, after the address is output and a predetermined period has elapsed, the memory controller 200 outputs the value "0×30" as an operation code.

In the busy period 450, the memory #1 (310) or the like sets R/B to the value "0" after a lapse of a predetermined time from fetching the operation code in the second operation code output period 440. After the reading from the memory #1 (310) or the like is completed and preparation for the transfer of the read data has been finished, the memory #1 (310) or the like sets R/B to the value "1" and notifies the memory controller 200 of this value.

In a data input period 480, after R/B is set to the value "1", the memory controller 200 sets W/R to the value "0". The memory controller 200 sets CLE and ALE to the value "1" after a lapse of a predetermined time.

After a predetermined time has further elapsed, the memory #1 (310) or the like outputs a signal having the same frequency as CLK as DQS and outputs the read data as I/O. The read data is output in synchronization with the rising and falling of DQS. These items serve as input data of the memory controller 200.

[Write Request Transfer]

Figure 9:
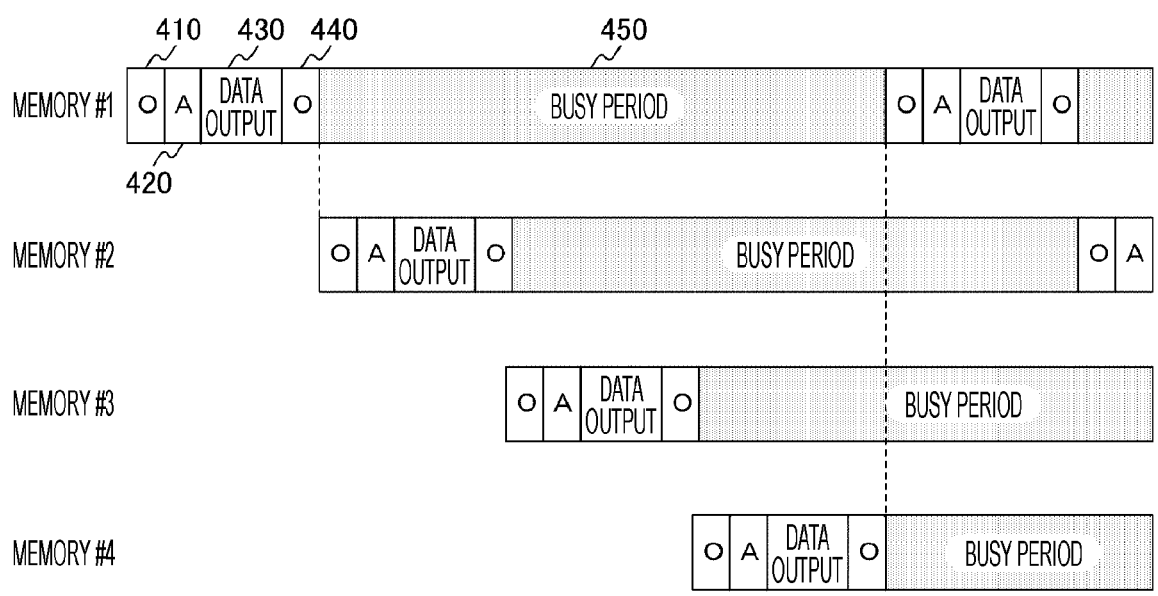
FIG. 9 is a diagram illustrating an example of a transfer operation for a write request according to the first embodiment of the present technology.

FIG. 9 is a diagram illustrating an example of a transfer operation for the write request according to the first embodiment of the present technology. FIG. 9 represents how the memory controller 200 transfers a plurality of write requests. FIG. 9 assumes a case where the write requests are consecutively transferred to the memories #1 (310) to #4 (340).

First, the memory controller 200 transfers the write request to the memory #1 (310). That is, the processes corresponding to the periods 410 to 440 are executed. With these processes, the memory #1 (310) is placed into the busy state represented by the busy period 450. During this busy period 450, the write requests and the write data are sequentially transferred to the memories #2 (320) to #4 (340). As represented in FIG. 9, the busy period 450 of the memory #1 (310) and the total of the periods of transferring the write requests and the write data for the memories #2 (320) to #4 (340) are substantially equalized. With this configuration, the transfer efficiency of the write request can be improved. As described with reference to FIG. 7, the requests and the write data for the memories #1 (310) to #4 (340) are transferred in synchronization with the clock signal. In contrast to this, the busy time does not depend on the frequency of the clock signal. Therefore, by adjusting the frequency of the clock signal, it is possible to substantially equalize the busy period 450 and the time required for transferring the write requests and the like.

Figure 10:
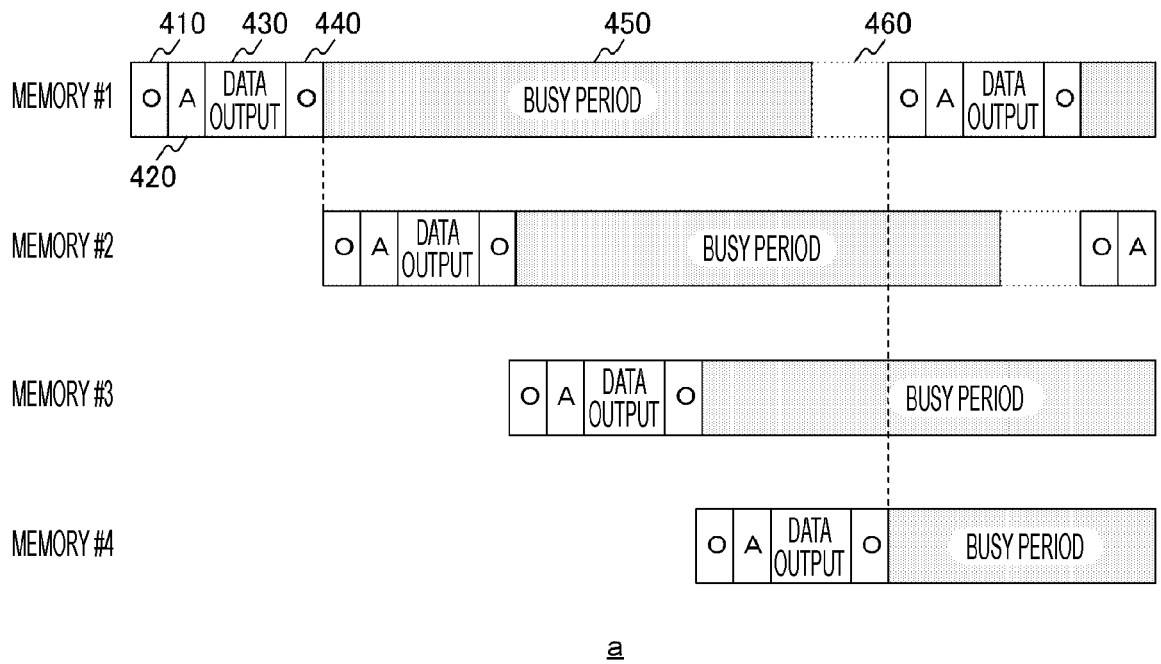
FIG. 10 is a diagram illustrating a transfer operation for the write request according to the first embodiment of the present technology in a case where the frequency of the clock signal is not appropriate.
Figure 10:
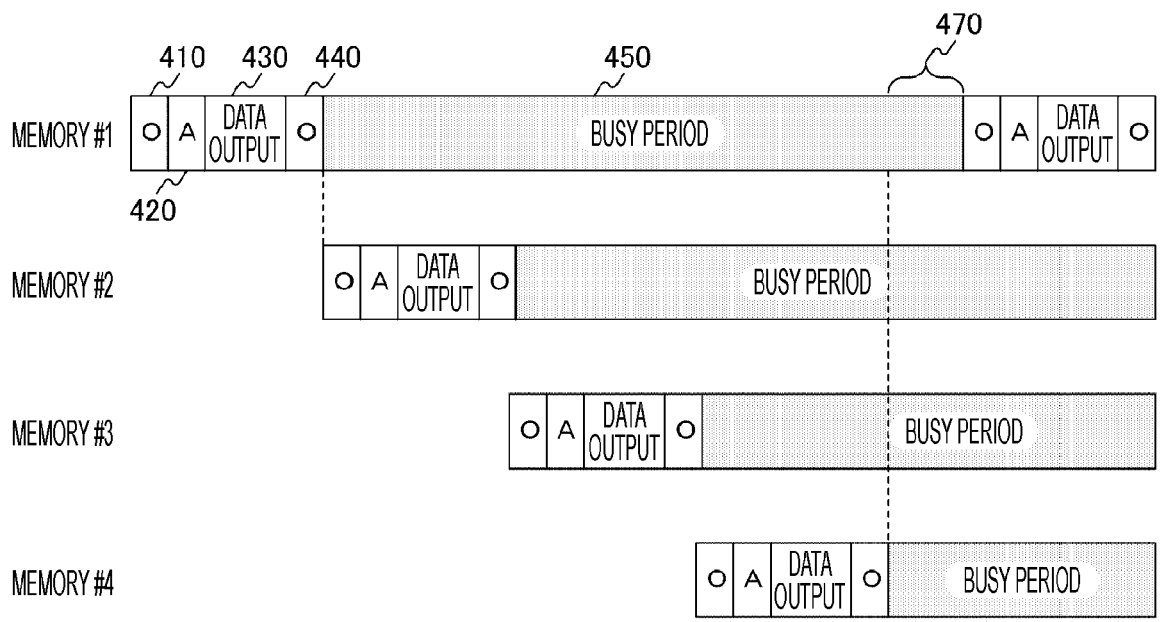

FIG. 10 is a diagram illustrating a transfer operation for the write request according to the first embodiment of the present technology in a case where the frequency of the clock signal is not appropriate. In FIG. 10, a represents an example in a case where the frequency of the clock signal is low as compared with the case described with reference to FIG. 9. The total of the periods during which the write requests and the data are transferred to the memories #2 (320) to #4 (340) is longer than the busy period 450 and a blank period 460 occurs in the memory #1 (310). Therefore, as compared with the case of FIG. 9, the transfer time of the data and the like between the memory controller 200 and the memory device 300 becomes long and the transfer efficiency decreases.

On the other hand, b of FIG. 10 represents an example in a case where the frequency of the clock signal is high as compared with the case described with reference to FIG. 9. The total of the periods during which the write requests and the data are transferred to the memories #2 (320) to #4 (340) is shorter than the busy period 450 and a period 470 during which the memories #2 (320) to #4 (340) are simultaneously in the busy state occurs. In this case, the transfer time of the data and the like between the memory controller 200 and the memory device 300 is equal to that in the case of FIG. 9. However, since the frequency of the clock signal is high, power consumption in the memory controller 200 and the memory device 300 increases. This is because the power consumption increases in proportion to the frequency of the clock signal.

[Read Request Transfer]

Figure 11:
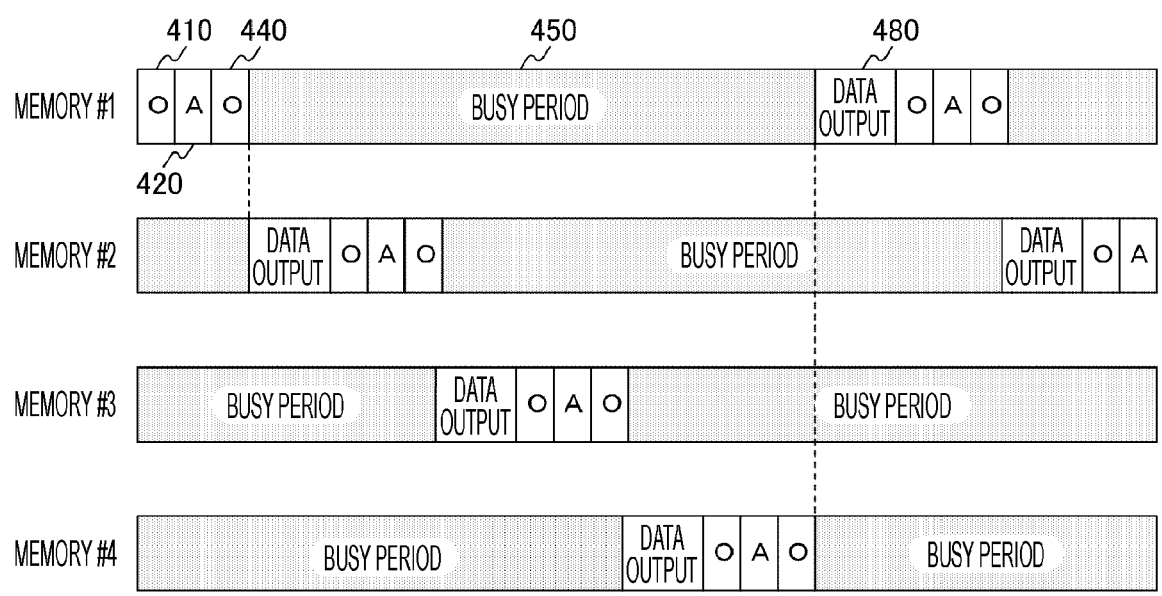
FIG. 11 is a diagram illustrating an example of a transfer operation for a read request according to the first embodiment of the present technology.

FIG. 11 is a diagram illustrating an example of a transfer operation for the read request according to the first embodiment of the present technology. FIG. 11 represents how the memory controller 200 transfers a plurality of read requests. As in FIG. 9, a case where the read requests are consecutively transferred to the memories #1 (310) to #4 (340) is assumed.

In the case of the read request, as described with reference to FIG. 8, the data input period 480 follows the busy period 450. An interval from this period 480 to the period 440 for the next read request is set as the time required for transferring the read requests and the data to adjust the clock signal. With this configuration, also in the read request, the requests and the like can be transferred at high speed while an increase in power consumption is prevented.

[Request Demanding Process]

Figure 12:
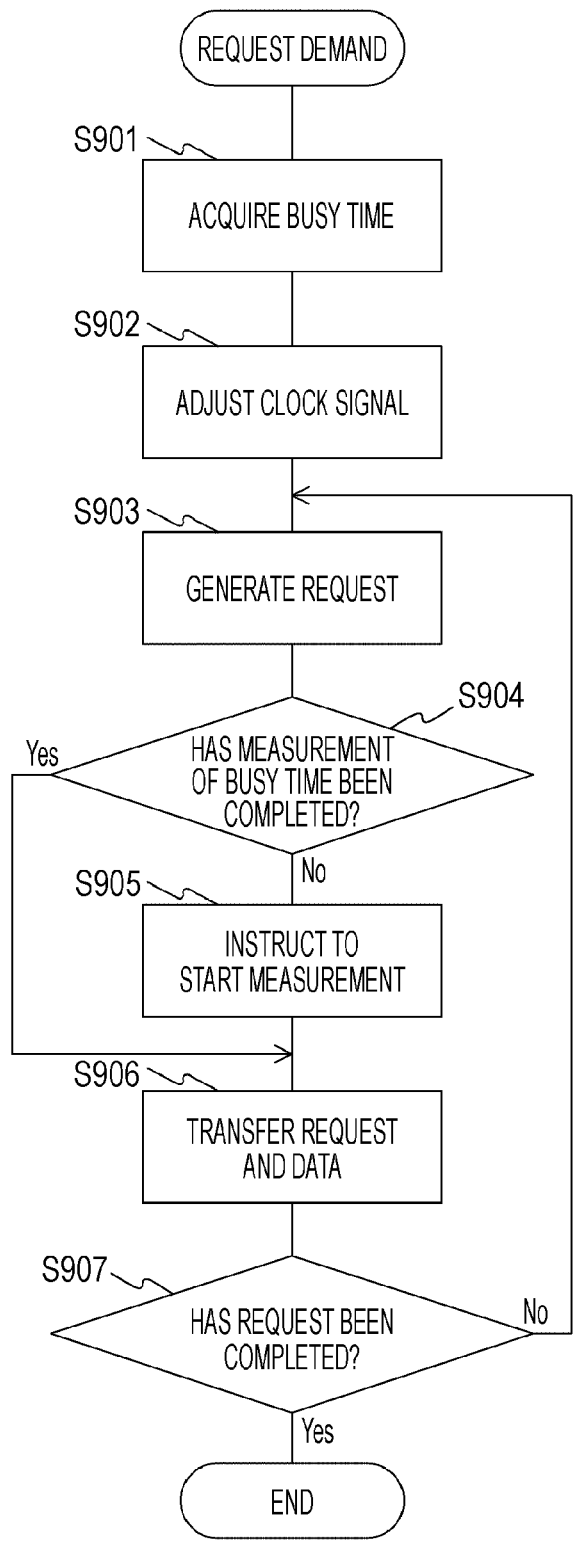
FIG. 12 is a diagram illustrating an example of process procedures of a request demanding process according to the first embodiment of the present technology.

FIG. 12 is a diagram illustrating an example of process procedures of a request demanding process according to the first embodiment of the present technology. Once the write or read command is issued from the host computer 100, the memory controller 200 starts this process. First, the clock signal adjustment unit 240 acquires the busy time according to the type of the command from the SRAM 210 (step S901). Specifically, in a case where the command is the write command, the busy time at the time of writing is acquired and, in a case where the command is the read command, the busy time at the time of reading is acquired. Next, the clock signal adjustment unit 240 adjusts the clock signal on the basis of the acquired busy time (step S902). Next, the processor 220 generates a request according to the command (step S903).

Next, the processor 220 determines whether the measurement of the busy time has been completed for both writing and reading (step S904). As a result, in a case where the measurement of the busy time has not been completed (step S904: No), the processor 220 outputs an instruction to start measurement to the busy time measurement unit 250 (step S905) and transitions to a process in step S906. Note that, in a case where the processor 220 generates a request for which the measurement of the busy time has not been completed in step S903, the processor 220 outputs this instruction to start measurement. On the other hand, in a case where the measurement of the busy time has been completed (step S904: Yes), the processor 220 skips the process in step S905. In step S906, the memory interface 260 transfers the generated request to the memory device 300 (step S906). In addition, the memory interface 260 further transfers the write data in the case of the write request and the read data in the case of the read request (step S906).

Next, the processor 220 determines whether the transfer of all the requests has been completed (step S907). As a result, in a case where there is an untransferred request (step S907: No), the processor 220 again executes the processes from step S903. On the other hand, in a case where the transfer of all the requests has been completed (step S907: Yes), the processor 220 ends the request demanding process.

[Busy Time Measurement Process]

Figure 13:
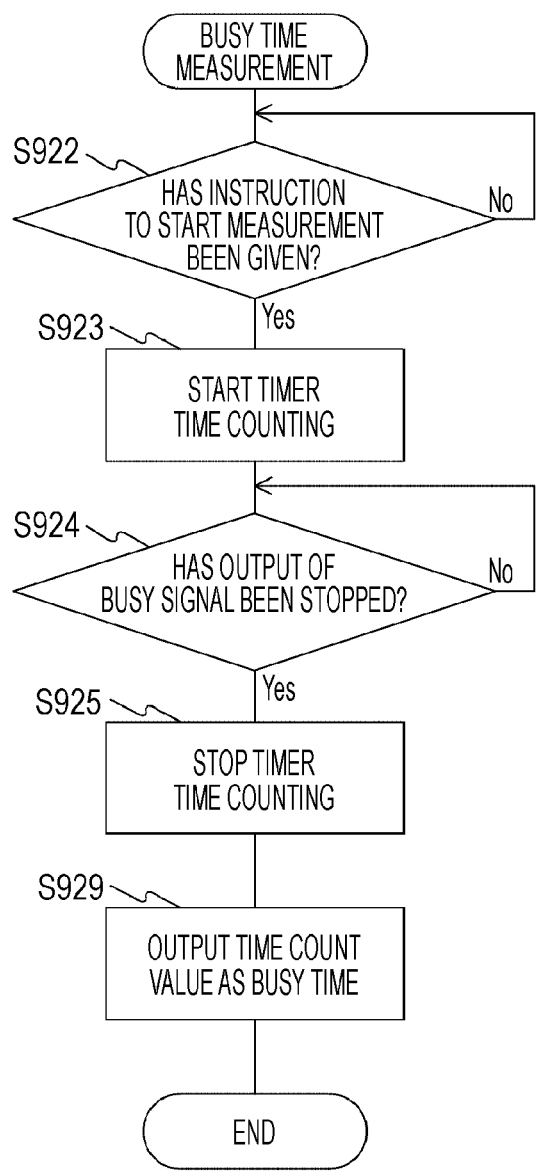
FIG. 13 is a diagram illustrating an example of process procedures of a busy time measurement process according to the first embodiment of the present technology.

FIG. 13 is a diagram illustrating an example of process procedures of a busy time measurement process according to the first embodiment of the present technology. First, the busy time measurement unit 250 stands by until an instruction to start measurement is output from the processor 220 (step S922). In a case where the instruction to start measurement is output (step S922: Yes), the busy time measurement unit 250 starts counting time using the timer 252 (step S923). Specifically, the busy time measurement unit 250 resets the timer 252 and waits for the input of the busy signal from the memory device 300 to start counting time using the timer 252. That is, the timer 252 starts counting time when the signal R/B on the signal line 209 described with reference to FIGS. 7 and 8 varies from the value "1" to the value "0". Next, the busy time measurement unit 250 stands by until the output of the busy signal from the memory device 300 is stopped (step S924). Specifically, the busy time measurement unit 250 stands by until the signal R/B shifts from the value "0" to the value "1". In a case where the output of the busy signal is stopped (step S924: Yes), the busy time measurement unit 250 stops counting time using the timer 252 (step S925). Next, the busy time measurement unit 250 outputs the time count value held in the timer 252 as a busy time (step S929) and ends the busy time measurement process.

In this manner, in the first embodiment of the present technology, the busy time of the memory #1 (310) or the like is measured and the frequency of the clock signal is adjusted on the basis of the measured busy time. With this configuration, a plurality of requests and data can be transferred to and from the memory device 300 without breaks and data and the like can be transferred at high speed while an increase in power consumption is prevented.

2. Second Embodiment

In the above embodiment, the busy time measured for one memory is applied to the adjustment of the clock signal for all the memories. In contrast to this, in a second embodiment of the present technology, the busy time is measured for all the memories and the clock signal is adjusted using the shortest busy time among these busy times. With this configuration, requests and data can be transferred at high speed in a case where the variance of the busy times of a plurality of memories to be used is large.

[Configuration of Busy Time Measurement Unit]

Figure 14:
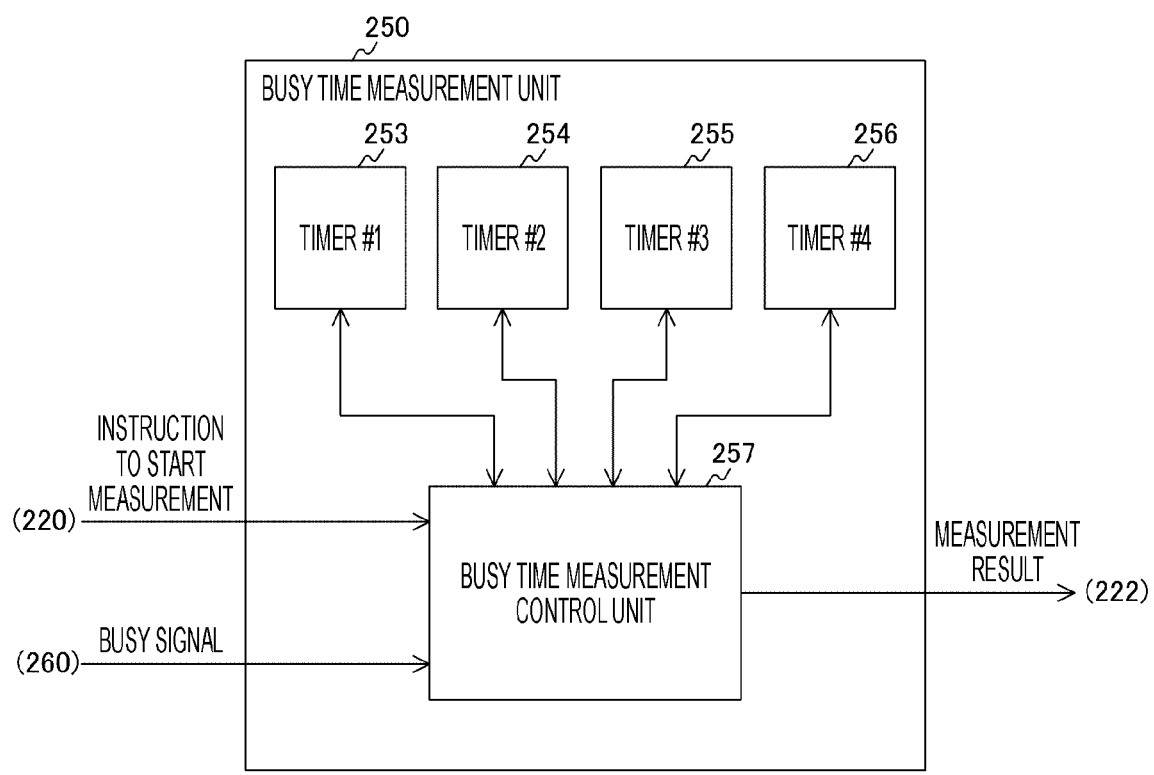
FIG. 14 is a diagram illustrating a configuration example of a busy time measurement unit 250 according to a second embodiment of the present technology.

FIG. 14 is a diagram illustrating a configuration example of a busy time measurement unit 250 according to the second embodiment of the present technology. This busy time measurement unit 250 is provided with a busy time measurement control unit 257 and timers #1 (253) to #4 (256).

As in the timer 252 described with reference to FIG. 4, the timers #1 (253) to #4 (256) are timers that count the busy time. These timers correspond to memories #1 (310) to #4 (340) arranged in a memory device 300 in a one-to-one manner so as to count the busy times of the corresponding memory #1 (310) and the like.

The busy time measurement control unit 257 controls the timers #1 (253) to #4 (256) to measure the busy time. The busy time measurement control unit 257 differs from the busy time measurement control unit 251 described with reference to FIG. 4 in that the busy time measurement control unit 257 controls a plurality of timers. The busy time measurement control unit 257 controls the timers #1 (253) to #4 (256) to individually measure the busy times for the memories #1 (310) to #4 (340). After the measurement, the shortest one of the time count values held in the timers #1 (253) to #4 (256) is output as a busy time and held in an SRAM 210.

With this configuration, the clock signal is adjusted on the basis of the shortest busy time among the busy times of the memories #1 (310) to #4 (340). Therefore, in a case where the variance of the busy times of the memories #1 (310) to #4 (340) is large, it is possible to transfer requests and data without the occurrence of the blank period 460 described with reference to FIG. 10. That is, requests and data can be transferred without breaks.

Since the configurations of a memory controller 200 and the memory device 300 other than the above configuration are similar to those of the memory controller 200 and the memory device 300 described in the first embodiment of the present technology, the description thereof will be omitted.

[Busy Time Measurement Process]

Figure 15:
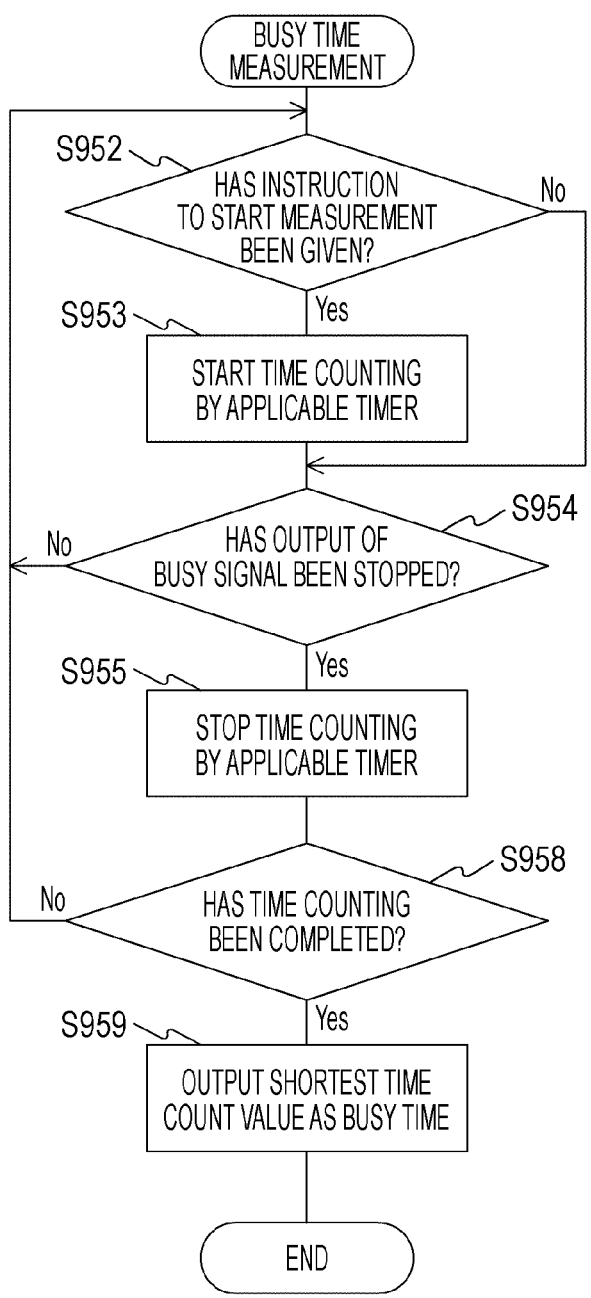
FIG. 15 is a diagram illustrating an example of process procedures of a busy time measurement process according to the second embodiment of the present technology.

FIG. 15 is a diagram illustrating an example of process procedures of a busy time measurement process according to the second embodiment of the present technology. First, the busy time measurement unit 250 determines whether an instruction to start measurement has been output from a processor 220 (step S952). In a case where the instruction to start measurement has been output (step S952: Yes), the busy time measurement unit 250 starts counting time using an applicable timer among the timers #1 (253) to #4 (256) (step S953). On the other hand, in a case where the instruction to start measurement has not been output from the processor (step S952: No), the busy time measurement unit 250 skips the process in step S953 and transitions to a process in step S954.

In step S954, the busy time measurement unit 250 determines whether the output of the busy signal from the memory device 300 has been stopped (step S954). In a case where the output of the busy signal has been stopped (step S954: Yes), the busy time measurement unit 250 stops the time counting by an applicable timer among the timers #1 (253) to #4 (256) (step S955) and transitions to a process in step S958. On the other hand, in a case where the output of the busy signal has not been stopped (step S954: No), the busy time measurement unit 250 again executes the processes from step S952. In step S958, the busy time measurement unit 250 determines whether the counting of the busy times for all of the memories #1 (310) to #4 (340) has been completed (step S958).

As a result, in a case where there is a memory for which the counting of the busy time has not been completed, the busy time measurement unit 250 again executes the processes from step S952. On the other hand, in a case where the counting of the busy times for all the memories has been completed (step S958: Yes), the busy time measurement unit 250 transitions to a process in step S959. In the process in step S959, the busy time measurement unit 250 outputs the shortest time count value among the time count values held in each of the timers #1 (253) to #4 (256) as a busy time (step S959) and ends the busy time measurement process.

Note that, since a request demanding process according to the second embodiment of the present technology is similar to the request demanding process described with reference to FIG. 12, the description thereof will be omitted.

In this manner, in the second embodiment of the present technology, the shortest busy time among the busy times of the memory #1 (310) and the like arranged in the memory device 300 is selected and the frequency of the clock signal is adjusted on the basis of the selected busy time. With this configuration, in a case where the variance of the busy times of the memory #1 (310) and the like is large, a plurality of requests and data can be transferred to and from the memory device 300 without breaks and data and the like can be transferred at high speed.

3. Third Embodiment

In the above first embodiment, the memory #1 (310) or the like with identical busy times at all addresses is used. In contrast to this, in a third embodiment of the present technology, the busy time is measured for a memory with different busy times for each address space. With this configuration, requests and data can be transferred at high speed in a storage device having memories with different busy times for each address space.

[Configuration of Storage Device]

A memory device 300 according to the third embodiment of the present technology is provided with memories #1 (310) to #4 (340) as in the memory device 300 described with reference to FIG. 1. In the third embodiment of the present technology, a NAND type flash memory of a multi-level cell (MLC) technique is used as these memories #1 (310) to #4 (340). This MLC technique is a technique of storing a plurality of bits in one memory cell, in which the amount of electric charges accumulated in a floating gate is determined from four or more multivalued values to store data of a plurality of bits. In the third embodiment of the present technology, a NAND type flash memory that stores two bits in one memory cell is assumed as the memories #1 (310) to #4 (340). On the other hand, the memory #1 (310) in the first embodiment of the present technology is a NAND type flash memory of a single-level cell (SLC) technique which stores one bit in one memory cell.

The NAND type flash memory of such an MLC technique is constituted by two areas of an upper page and a lower page and each area has a different time required for access. Correspondence relationships of the above upper page and lower page with the page addresses are defined in advance by the NAND type flash memory of the MLC technique. On the basis of these correspondence relationships, a memory controller 200 according to the third embodiment of the present technology measures the busy time and adjusts the clock signal for each of the address spaces in which the times required for access differ.

[Configuration of Busy Time Measurement Unit]

Figures 16, 17:
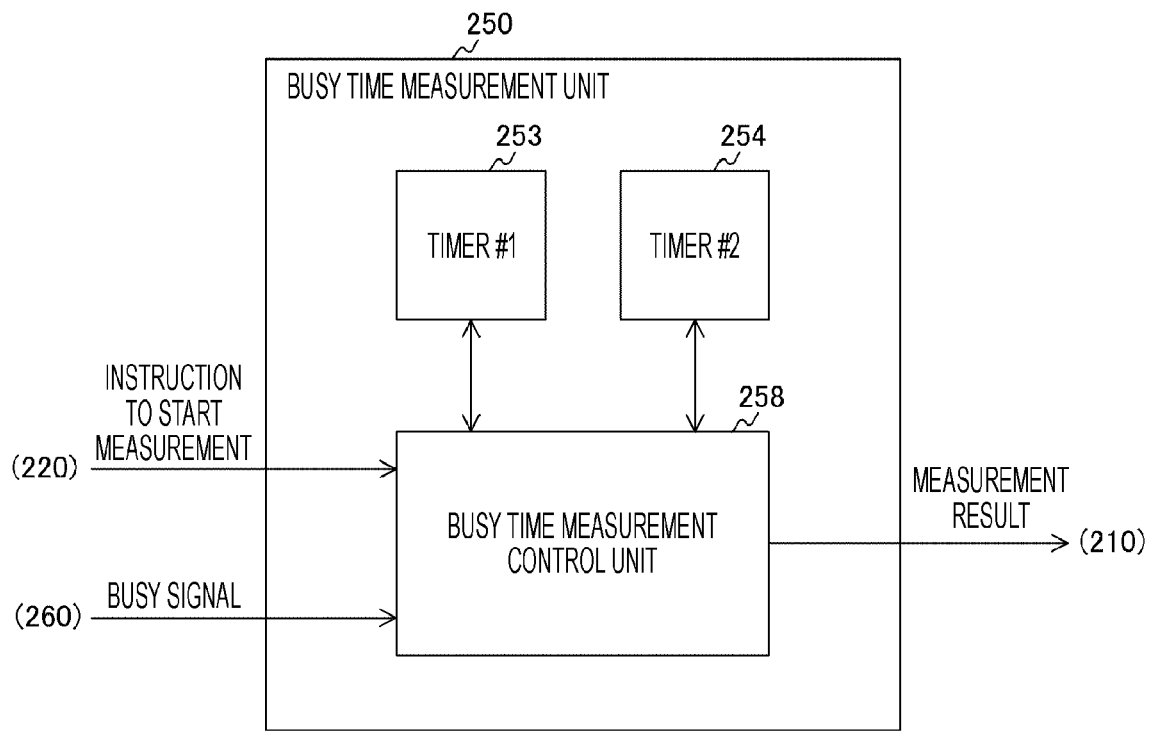
FIG. 16 is a diagram illustrating a configuration example of a busy time measurement unit 250 according to a third embodiment of the present technology.
FIG. 17 is a diagram illustrating examples of the busy time according to the third embodiment of the present technology.

FIG. 16 is a diagram illustrating a configuration example of a busy time measurement unit 250 according to the third embodiment of the present technology. This busy time measurement unit 250 is provided with a busy time measurement control unit 258 and timers #1 (253) and #2 (254).

As in the timers #1 (253) and #2 (254) described with reference to FIG. 14, the timers #1 (253) and #2 (254) are timers that count the busy time. The timer #1 (253) in FIG. 16 counts the busy time in accessing the upper page. Meanwhile, the timer #2 (254) in FIG. 16 counts the busy time in accessing the lower page.

The busy time measurement control unit 258 controls the timers #1 (253) and #2 (254) to measure the busy time. The busy time measurement control unit 258 differs from the busy time measurement control unit 251 described with reference to FIG. 4 in that the busy time measurement control unit 258 measures the busy time for each address space. When a processor 220 outputs an instruction to start measurement, the processor 220 further outputs information regarding the address. On the basis of this information regarding the address, the busy time measurement control unit 258 determines whether an access destination of the request is the upper page or the lower page and controls the applicable timer #1 (253) or timer #2 (254) to measure the busy time. Thereafter, the busy time measurement control unit 258 outputs the busy time for each address space and causes an SRAM 210 to hold the busy time.

[Busy Time]

FIG. 17 is a diagram illustrating examples of the busy time according to the third embodiment of the present technology. As represented in FIG. 17, the busy times are held in the SRAM 210 by classifying into four cases of writing and reading and the upper page and the lower page.

A clock signal adjustment unit 240 reads the busy time for the upper or lower page from the SRAM 210 according to a target address of the request and adjusts the frequency of the clock signal.

With this configuration, the busy time of the memory #1 (310) or the like is measured for each address space and the frequency of the clock signal can be adjusted on the basis of this busy time.

Since the configurations of the memory controller 200 and the memory device 300 other than the above configuration are similar to those of the memory controller 200 and the memory device 300 described in the first embodiment of the present technology, the description thereof will be omitted.

[Request Demanding Process]

Figure 18:
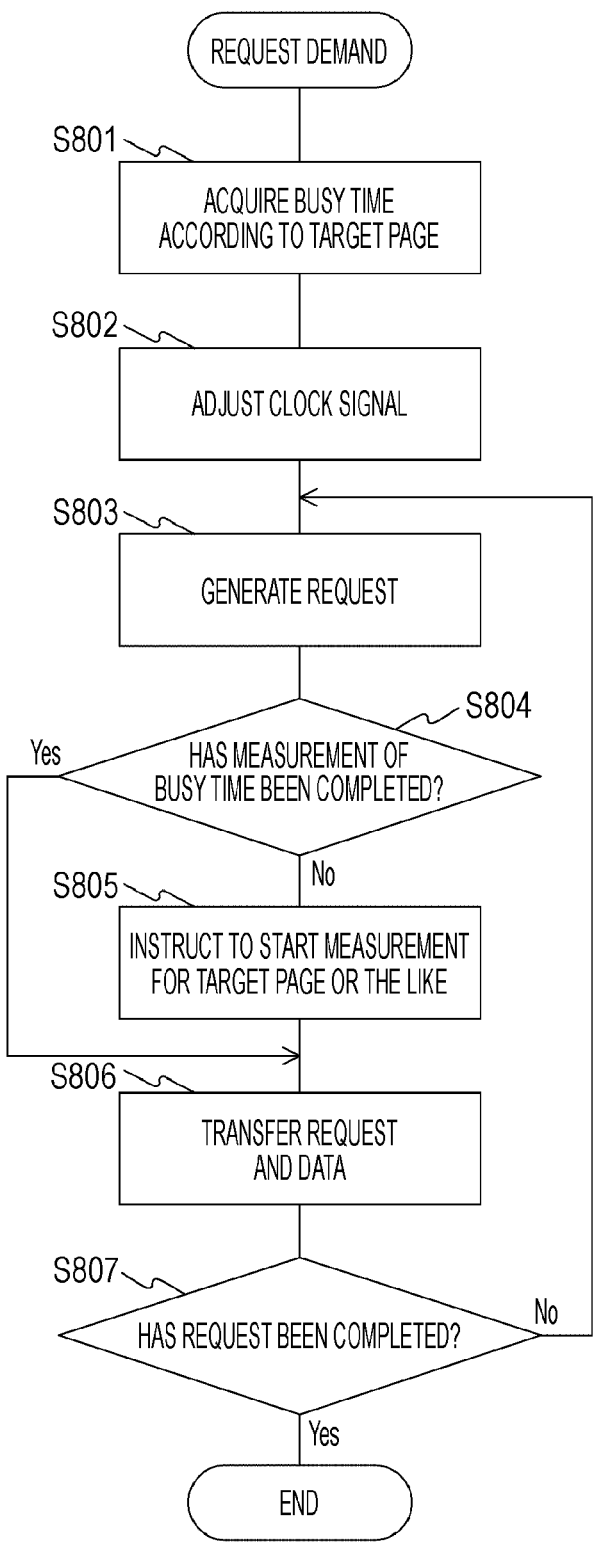
FIG. 18 is a diagram illustrating an example of process procedures of a request demanding process according to the third embodiment of the present technology.

FIG. 18 is a diagram illustrating an example of process procedures of a request demanding process according to the third embodiment of the present technology. First, the clock signal adjustment unit 240 acquires the busy time from the SRAM 210 according to the type of the command and a target page (step S801). Next, the clock signal adjustment unit 240 adjusts the clock signal on the basis of the acquired busy time (step S802). Next, the processor 220 generates a request according to the command (step S803). Next, the processor 220 determines whether the measurement of all the busy times for writing and reading and the upper page and the lower page has been completed (step S804). As a result, in a case where the measurement of the busy times has not been completed (step S804: No), the processor 220 outputs an instruction to start measurement for the target page or the like to the busy time measurement unit 250 (step S805) and transitions to a process in step S806.

On the other hand, in a case where the measurement of the busy times has been completed (step S804: Yes), the processor 220 skips the process in step S805. In step S806, a memory interface 260 transfers the generated request to the memory device 300 (step S806). In addition, the memory interface 260 further transfers the write data in the case of the write request and the read data in the case of the read request (step S806). Next, the processor 220 determines whether the transfer of all the requests has been completed (step S807) and, in a case where there is an untransferred request (step S807: No), the processor 220 again executes the processes from step S803. On the other hand, in a case where the transfer of all the requests has been completed (step S807: Yes), the processor 220 ends the request demanding process.

[Busy Time Measurement Process]

Figure 19:
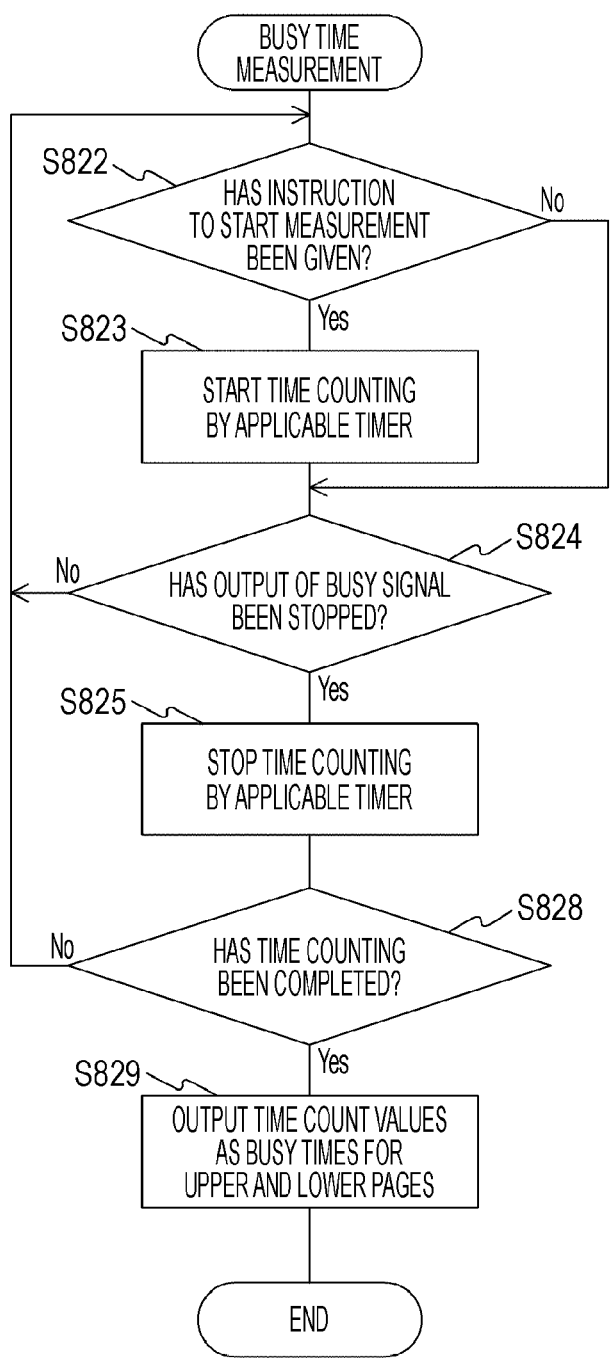
FIG. 19 is a diagram illustrating an example of process procedures of a busy time measurement process according to the third embodiment of the present technology.

FIG. 19 is a diagram illustrating an example of process procedures of a busy time measurement process according to the third embodiment of the present technology. First, the busy time measurement unit 250 determines whether an instruction to start measurement has been output from the processor 220 (step S822). In a case where the instruction to start measurement has been output (step S822: Yes), the busy time measurement unit 250 starts counting time using an applicable timer among the timers #1 (253) and #2 (254) (step S823). On the other hand, in a case where the instruction to start measurement has not been output from the processor (step S822: No), the busy time measurement unit 250 skips the process in step S823 and transitions to a process in step S824. In step S824, the busy time measurement unit 250 determines whether the output of the busy signal from the memory device 300 has been stopped (step S824). In a case where the output of the busy signal has been stopped (step S824: Yes), the busy time measurement unit 250 stops the time counting by an applicable timer among the timers #1 (253) and #2 (254) (step S825) and transitions to a process in step S828. On the other hand, in a case where the output of the busy signal has not been stopped (step S824: No), the busy time measurement unit 250 again executes the processes from step S822.

In step S828, the busy time measurement unit 250 determines whether the counting of the busy times has been completed for both of the upper page and the lower page (step S828). In a case where the time counting has not been completed (step S828: No), the busy time measurement unit 250 again executes the processes from step S822. On the other hand, in a case where the time counting has been completed (step S828: Yes), the busy time measurement unit 250 outputs the time count values held in the timers #1 (253) and #2 (254) as busy times for the upper and lower pages (step S829). Thereafter, the busy time measurement unit 250 ends the busy time measurement process.

In this manner, in the third embodiment of the present technology, the busy times for the upper and lower pages are separately measured and the clock signal is adjusted on the basis of the measured busy times. With this configuration, in the memory device 300 provided with memories with different busy times according to addresses, such as the NAND flash memory of the MLC technique, requests and data can be transferred to and from the memory device 300 without breaks.

As described above, according to the present embodiment, it is possible to transfer requests and data between the memory controller 200 and the memory device 300 without breaks by adjusting the clock signal on the basis of the busy time. With this configuration, high-speed data transfer can be performed in a storage device having a plurality of semiconductor memories while an increase in power consumption is prevented.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

In addition, the process procedures described in the above embodiments may be regarded as a method having these series of procedures and additionally, may be regarded as a program for causing a computer to execute these series of procedures or as a recording medium storing the program. As this recording medium, for example, a compact disc (CD), a mini disc (MD), a digital versatile disc (DVD), a memory card, or a Blu-ray (registered trademark) disc can be used.

Note that the effects described in the present description merely serve as examples and not construed to be limited. There may be another effect as well.

Note that the present technology can be also configured as described below.

(1) A memory controller including:

a request transfer unit that transfers a request for demanding transfer of data and data based on the request to each of a plurality of memories in synchronization with a clock signal;

a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal.

(2) The memory controller according to (1) above, in which the busy time measurement unit measures the busy time on the basis of a busy signal output from each of the plurality of memories to indicate that the access is being performed.

(3) The memory controller according to (1) or (2) above, further including a busy time holding unit that holds the measured busy time, in which the clock signal adjustment unit substantially equalizes the held busy time and a total time required for transferring the requests and the data for the plurality of memories except the selected memory by adjusting the frequency of the clock signal.

(4) The memory controller according to any one of (1) to (3) above, in which the busy time measurement unit measures the busy time for each of the plurality of memories and supplies a shortest busy time among the separately measured busy times to the clock signal adjustment unit.

(5) The memory controller according to any one of (1) to (4) above, in which the request transfer unit transfers a write request for demanding writing of the data and write data based on the write request in synchronization with a clock signal;

the busy time measurement unit measures the busy time of the selected memory based on the write request; and the clock signal adjustment unit substantially equalizes the measured busy time of the selected memory and a total time required for transferring the write requests and the write data for the plurality of memories except the selected memory by adjusting the frequency of the clock signal.

(6) The memory controller according to any one of (1) to (4) above, in which the request transfer unit transfers a read request for demanding reading of the data and read data based on the read request in synchronization with a clock signal;

the busy time measurement unit measures the busy time of the selected memory based on the read request; and the clock signal adjustment unit substantially equalizes the measured busy time of the selected memory and a total time required for transferring the read requests and the read data for the plurality of memories except the selected memory by adjusting the frequency of the clock signal.

(7) The memory controller according to any one of (1) to (6) above, in which the busy time measurement unit measures the busy time for each of address spaces of the plurality of memories in which times required for the access differ for each address space, and the clock signal adjustment unit adjusts the frequency of the clock signal for each address space.

(8) A storage device including:

a plurality of memories;

a request transfer unit that transfers a request for demanding transfer of data and data based on the request to each of the plurality of memories in synchronization with a clock signal;

a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal.

(9) An information processing system including:

a storage device provided with:

a plurality of memories;

a request transfer unit that transfers a request for demanding transfer of data and data based on the request to each of the plurality of memories in synchronization with a clock signal;

a busy time measurement unit that measures a busy time which is a time required for access based on the request, for a selected memory which is one memory out of the plurality of memories; and a clock signal adjustment unit that substantially equalizes the measured busy time of the selected memory and a total time required for transferring the requests and the data for the plurality of memories except the selected memory by adjusting a frequency of the clock signal; and a host computer that accesses the storage device.

(10) A memory control method including:

a request transfer procedure of transferring a request for demanding transfer of data and data based on the request to each of a plurality of memories in synchronization with a clock signal;

a busy time measurement procedure of measuring a busy time which is a time required for access based on the request, for a selected memory which is one memory out of the plurality of memories; and a clock signal adjustment procedure of substantially equalizing the measured busy time of the selected memory and a total time required for transferring the requests and the data for the plurality of memories except the selected memory by adjusting a frequency of the clock signal.

REFERENCE SIGNS LIST

100 Host computer
200 Memory controller
210 SRAM
220 Processor
230 Host interface
240 Clock signal adjustment unit
241 Clock signal adjustment control unit
242 PLL
250 Busy time measurement unit
251, 257, 258 Busy time measurement control unit
252 to 256 Timer
260 Memory interface
300 Memory device
310, 320, 330, 340 Memory

The invention claimed is:

1. A memory controller comprising:
a request transfer unit that transfers a request for demanding transfer of data and data based on the request, to each of a plurality of memories in synchronization with a clock signal;
a busy time measurement unit that measures a busy time for a selected memory which is one memory out of the plurality of memories, the busy time for the selected memory being a time required for access based on the request to the selected memory; and
a clock signal adjustment unit that substantially equalizes the measured busy time of the selected memory and a total time required for transferring the requests and the data for the plurality of memories except the selected memory by adjusting a frequency of the clock signal.

2. The memory controller according to claim 1, wherein the busy time measurement unit measures a busy time for each of the plurality of memories on the basis of a corresponding busy signal output from each of the plurality of memories to indicate that an access is being performed.

3. The memory controller according to claim 1, further comprising a busy time holding unit that holds the measured busy time, wherein
the clock signal adjustment unit substantially equalizes the held busy time and the total time required for transferring the requests and the data for the plurality of memories except the selected memory by adjusting the frequency of the clock signal.

4. The memory controller according to claim 1, wherein the busy time measurement unit separately measures a busy time for each of the plurality of memories and supplies a shortest busy time among the separately measured busy times to the clock signal adjustment unit.

5. The memory controller according to claim 1, wherein the request transfer unit transfers a write request for demanding writing of data and write data based on the write request in synchronization with a clock signal;
the busy time measurement unit measures the busy time of the selected memory based on the write request; and
the clock signal adjustment unit substantially equalizes the measured busy time of the selected memory and a total time required for transferring the write requests and the write data for the plurality of memories except the selected memory by adjusting the frequency of the clock signal.

6. The memory controller according to claim 1, wherein
the request transfer unit transfers a read request for demanding reading of the data and read data based on the read request in synchronization with a clock signal;
the busy time measurement unit measures the busy time of the selected memory based on the read request; and
the clock signal adjustment unit substantially equalizes the measured busy time of the selected memory and a total time required for transferring the read requests and the read data for the plurality of memories except the selected memory by adjusting the frequency of the clock signal.

7. The memory controller according to claim 1, wherein
the busy time measurement unit measures the busy time for each of address spaces of each of the plurality of memories in which times required for access differ for each address space, and
the clock signal adjustment unit adjusts the frequency of the clock signal for each address space.

8. A storage device comprising:
a plurality of memories;
a request transfer unit that transfers a request, for demanding transfer of data and data based on the request, to each of the plurality of memories in synchronization with a clock signal;
a busy time measurement unit that measures a busy time for a selected memory which is one memory out of the plurality of memories, the busy time for the selected memory being a time required for access based on the request to the selected memory; and
a clock signal adjustment unit that substantially equalizes the measured busy time of the selected memory and a total time required for transferring the requests and the data for the plurality of memories except the selected memory by adjusting a frequency of the clock signal.

9. An information processing system comprising:
a storage device provided with:
a plurality of memories;
a request transfer unit that transfers a request, for demanding transfer of data and data based on the request, to each of the plurality of memories in synchronization with a clock signal;
a busy time measurement unit that measures a busy time for a selected memory which is one memory out of the plurality of memories, the busy time for the selected memory being a time required for access based on the request to the selected memory; and
a clock signal adjustment unit that substantially equalizes the measured busy time of the selected memory and a total time required for transferring the requests and the data for the plurality of memories except the selected memory by adjusting a frequency of the clock signal; and
a host computer that accesses the storage device.

10. A memory control method comprising:
a request transfer procedure of transferring a request, for demanding transfer of data and data based on the request, to each of a plurality of memories in synchronization with a clock signal;
a busy time measurement procedure of measuring a busy time for a selected memory which is one memory out of the plurality of memories, the busy time for the selected memory being a time required for access based on the request to the selected memory; and
a clock signal adjustment procedure of substantially equalizing the measured busy time of the selected memory and a total time required for transferring the requests and the data for the plurality of memories except the selected memory by adjusting a frequency of the clock signal.

* * * * *